(12) United States Patent
Sandler et al.

(10) Patent No.: US 10,498,904 B1
(45) Date of Patent: Dec. 3, 2019

(54) AUTOMATED TELEPHONE HOST SYSTEM INTERACTION

(71) Applicant: REPNOW INC., San Diego, CA (US)

(72) Inventors: Michael Sandler, San Diego, CA (US); Fredrick Korfin, San Diego, CA (US); Alexander Boone, San Diego, CA (US); Stanfell Boone, Thousand Oaks, CA (US)

(73) Assignee: REPNOW, INC., San Francisco, CA (US)

( * ) Notice: Subject to any disclaimer, the term of this patent is extended or adjusted under 35 U.S.C. 154(b) by 0 days.

(21) Appl. No.: 16/039,981

(22) Filed: Jul. 19, 2018

Related U.S. Application Data

(63) Continuation-in-part of application No. 15/821,579, filed on Nov. 22, 2017.

(51) Int. Cl.
*H04M 3/493* (2006.01)
*H04M 7/12* (2006.01)
*H04M 3/51* (2006.01)

(52) U.S. Cl.
CPC ....... *H04M 7/1295* (2013.01); *H04M 3/4936* (2013.01); *H04M 3/5133* (2013.01); *H04M 3/5175* (2013.01); *H04M 3/5191* (2013.01)

(58) Field of Classification Search
None
See application file for complete search history.

(56) References Cited

U.S. PATENT DOCUMENTS

| | | | | |
|---|---|---|---|---|
| 5,937,040 A | * | 8/1999 | Wrede | H04M 1/247 370/524 |
| 6,389,293 B1 | * | 5/2002 | Clore | H04M 1/6505 455/194.1 |
| 8,467,515 B2 | * | 6/2013 | Czachor, Jr. | H04M 3/5235 379/214.01 |
| 8,948,351 B2 | * | 2/2015 | Gopal | H04M 3/533 379/88.22 |
| 2005/0201534 A1 | * | 9/2005 | Ignatin | H04M 1/663 379/88.22 |
| 2007/0133759 A1 | * | 6/2007 | Malik | H04M 3/493 379/80 |
| 2009/0089181 A1 | * | 4/2009 | Mathis, Jr. | G06Q 20/32 705/26.1 |
| 2010/0091956 A1 | * | 4/2010 | Gopal | H04M 3/533 379/88.12 |
| 2013/0295889 A1 | * | 11/2013 | Das | H04W 4/046 455/414.1 |

(Continued)

*Primary Examiner* — Kodzovi Acolatse
(74) *Attorney, Agent, or Firm* — Kwan & Olynick LLP

(57) ABSTRACT

Systems and methods for automated telephone host system interaction. A system can include one or more client applications executable by respective communication devices and a server in communication with the respective communication devices. The system can store caller information for a caller and receive, from the caller, requests associated with a service provider. Responsive to the requests, the system can cause initiation of a call center call to a call center associated with the service provider, automatically navigate a call handling system of the call center, monitor a held call center call, and detect when a live agent answers the call. A data center remote from the communication devices can at least partially control call handling at the communication devices.

24 Claims, 16 Drawing Sheets

(56) References Cited

U.S. PATENT DOCUMENTS

2015/0249737 A1* 9/2015 Spievak ............... H04M 3/436
379/189
2016/0227034 A1* 8/2016 Kulkarni ............... H04M 3/493

\* cited by examiner

AUTOMATED TELEPHONE HOST SYSTEM INTERACTION

CROSS-REFERENCE TO RELATED APPLICATIONS

This application incorporates by reference the entirety of U.S. patent application Ser. No. 15/821,579, filed Nov. 22, 2017, titled "AUTOMATED TELEPHONE HOST SYSTEM INTERACTION."

BACKGROUND

Interacting with telephone host systems may be tedious and complicated. A user attempting to reach a customer service representative to resolve a question or concern may be required to identify an appropriate telephone number to call, navigate a time-consuming interactive voice response or other automated host system, and wait on hold until a live agent is available to answer the user's call. If the user is disconnected or unable to wait for a live agent, the user may need to repeat the process multiple times to speak to a live agent. The process of phone communication through selecting menu options may be wasteful for a user's time, as the user must wait for the options to be spoken. Although there may be a variety of ways for a user to reach a company to resolve an issue, email or telephone are typically the most frequent ways to make contact, and phone calls are often the most preferred channel for general inquiries.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, a system comprises one or more client applications executable by respective communication devices, each communication device comprising one or more processors configured with processor-executable instructions included in the client application to perform operations comprising at least storing, by the communication device, caller information for a calling party, wherein the caller information includes generic caller information and provider specific caller information; receiving, via the communication device, a request associated with a service provider; determining that the request is associated with at least one of the generic caller information and the provider specific caller information; and transmitting request information including the generic caller information and the provider specific caller information via a network. The system further comprises a server comprising one or more processors configured with processor-executable instructions to perform operations comprising at least receiving, via the network, the request information from the communication device; and transmitting, to the communication device, call center information associated with a call center of the service provider corresponding to the request. The one or more processors of the communication device are further configured with processor-executable instructions to perform operations comprising, responsive to receiving the call center information, at least initiating a call center call to the call center; initiating a server call to the server; and bridging the server call and the call center call in a muted mode such that audio can be transmitted between the server, the communication device, and the call center without being transmitted by a speaker of the communication device. The one or more processors of the server are further configured with processor-executable instructions to perform operations comprising at least determining that a live agent associated with the call center of the service provider has answered the call center call based at least in part on information detected from the call center call; and sending a control message to the communication device to cause the communication device to terminate the muted mode such that audio can be transmitted between the user and the live agent.

In another embodiment, a system comprises one or more client applications executable by respective communication devices, each communication device comprising one or more processors configured with processor-executable instructions included in the client application to perform operations comprising storing, by a communication device, user information for a user, wherein the user information includes generic user information and provider specific user information; receiving, from the user of the communication device, a request associated with a service provider; determining that the request is associated with at least one of the generic user information and the provider specific user information; and transmitting request information including the generic user information and the provider specific user information via a network. The system further comprises a server comprising one or more processors configured with processor-executable instructions to perform operations comprising receiving, via the network, the request information from the communication device; and transmitting, to the communication device, call center information associated with a call center corresponding to the request and call flow information corresponding to the request. The one or more processors of the communication device are further configured with processor-executable instructions to perform operations comprising, responsive to receiving the call center information and the call flow information, initiating a call to the call center in a muted mode such that audio can be transmitted between the communication device and the call center without being played by a speaker of the communication device; determining that a live agent has answered the call; and terminating the muted mode such that audio can be transmitted between the user and the live agent.

In another embodiment, a system comprises one or more client applications executable by respective communication devices, each communication device comprising one or more processors configured with processor-executable instructions included in the client application to perform operations comprising storing, by a communication device, user information for a user, wherein the user information includes generic user information and provider specific user information; receiving, from the user of the communication device, a request associated with a service provider; determining that the request is associated with at least one of the generic user information and the provider specific user information; and transmitting request information including the generic user information and the provider specific user information via a network. The system further comprises a server comprising one or more processors configured with processor-executable instructions to perform operations comprising receiving, via the network, the request information from the communication device; identifying a call center corresponding to the request; selecting between a trilateral call handling functionality and a bilateral call handling functionality based at least in part on one or more of a network latency between the server and the communication device, an identity of the call center, call flow information corresponding to the call center, a characteristic of the communication device, and a request type corresponding the request information; and transmitting, to the communication device, call information associated with a call center corresponding to the request.

In another embodiment, a method comprises storing, at a communication device, user information for a user, wherein the user information includes generic user information and provider specific user information; receiving, via a client application executing on the communication device, a request from the user, the request associated with a service provider; determining, by the client application, that the request is associated with at least one of the generic user information and the provider specific user information; transmitting, from the communication device to a server associated with the client application, request information including the generic user information and the provider specific user information via a network; receiving, at the server via the network, the request information from the communication device; identifying, at the server, a third-party call center corresponding to the request; automatically selecting, by the server, between a trilateral call handling functionality and a bilateral call handling functionality based at least in part on one or more of a network latency between the server and the communication device, an identity of the call center, call flow information corresponding to the call center, a characteristic of the communication device, and a request type corresponding to the request information; and transmitting, from the server to the communication device, call information associated with a call center corresponding to the request.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
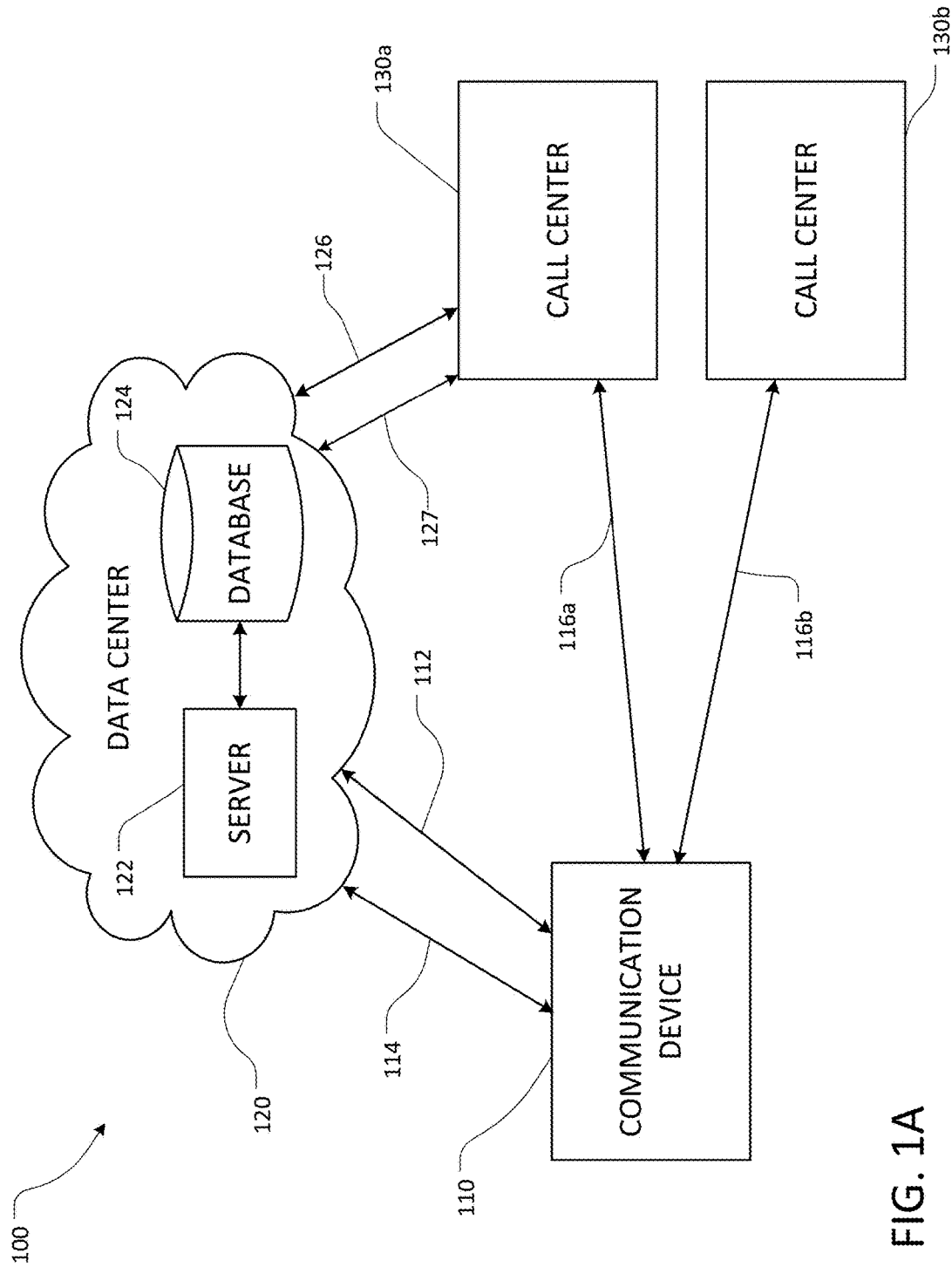
FIG. 1A is a block diagram showing an example communication system for automated telephone host system interaction.

Generally described, the systems and methods described herein provide enhanced interaction between callers and call centers. In some embodiments, a caller's interaction with a call center may be reduced and/or simplified by conducting calls from a communication device to a call center in a background mode in a process which is at least partially controlled by an automated data center in conjunction with a service provider application executing on the communication device.

In one example implementation, the application is an application executing, at least in part, on a mobile phone or other communication device. The application includes instructions configuring the mobile device for receiving and interpreting requests from a calling party (e.g., a caller) to be connected to an agent at a desired entity. For example, the caller may request, via the mobile phone, to speak to an agent at the caller's wireless carrier regarding a problem with a bill, an agent at an airline to make a change to a reservation, an agent at a utility company to report a problem, etc. The application can send the request or information associated with the request to the automated data center associated with the application. Subsequently, various systems and call flows described herein allow for navigation of an automated telephone system at a call center associated with the desired entity and monitoring of call holding, until a live agent at the call center answers the call. A call between the communication device and the call center may be maintained in a background or muted mode during navigation and monitoring. When the live agent answers the call, the system can notify the caller, for example, by transitioning the call to an active and/or unmuted mode. The caller is thus able to communicate directly with the live agent without having to manually navigate an automatic call distribution (ACD) system or interactive voice response (IVR) system, or actively wait on hold.

In some embodiments, the system may use natural language processing to direct a call to the appropriate call center based on a conversational request from the caller. In further embodiments, the system may utilize an automatic speaker mode to alert or immediately connect the caller to a live agent that is on the line pursuant to their request. Additionally, a proxy message may be played to the live agent while the caller is notified so as to prevent the live agent from hanging up if there is a delay in the caller responding to the live agent in response to the notification. If the caller is placed on a secondary hold after being connected to a live agent, the call can return to a background or muted mode while the communication device remains on the line that is on hold, and the caller can be notified when the live agent returns. In further embodiments, the system may be configured for audio recording of the interaction between the caller and the live agent. The recording may occur at the communication device and/or at the data center. In addition, certain embodiments may allow automated in-call surveys to be administered through a user interface on the communication device after the call is terminated to enhance user participation and efficiency of call center surveys with both affiliated and unaffiliated call centers, as the system would be able to translate the user interface answers with the required device interface.

In some embodiments, multi-channel processing may allow the system to use the caller's input data alone or in combination with the call center organization's data to help a caller resolve their request during the time that the call center call is being navigated and/or held. For example, the call center organization's data may include data regarding self-help for the caller, such as information on frequently asked questions and/or forums, and can include an immediate connection with quicker or more readily available customer service options of the service provider, such as chat bots, live chat, or the like, to assist the caller in possibly resolving their request while the call center call is still being placed. The call center organization's data may be retrieved, for example, by determining, using natural language processing, a URL or other resource locator provided by the call center in a recorded hold message while the call center call is on hold. In some embodiments, this can improve efficiency for both the caller and the call center, as some issues may be resolvable while the caller waits for the call with the live agent, and the call may be ended before the live agent is connected, allowing the live agent to assist another caller. Multi-channel processing may further be efficient as information collected through the self-help channel may be provided to the live agent or call handling system to decrease the time required to resolve the caller's issue.

Various components of the methods described herein may be allocated between the communication device and the data center. For example, in some embodiments the data center may cause initiation of call legs to the call center and the communication device, for example, using a VoIP service or the like. Such embodiments are described in U.S. patent application Ser. No. 15/821,579, filed Nov. 22, 2017, and titled "AUTOMATED TELEPHONE HOST SYSTEM INTERACTION." In other embodiments, call initiation functionality may be controlled by the communication device, alone or at least partially under control of the data center.

FIG. 1A schematically depicts an example communication system 100 configured for call handling functionality in accordance with various embodiments described herein. The system 100 generally includes a communication device 110 and a data center 120. The system 100 is operable to interact with one or more call centers 130*a*, 130*b*. The data center 120 includes at least one server 122 and at least one database 124.

Non-limiting examples of the communication device 110 include a personal computing device, laptop computing device, hand held computing device, mobile device (e.g., mobile phones or tablet computing devices), wearable device configured with network access and program execution capabilities (e.g., "smart eyewear" or "smart watches"), wireless device, electronic reader, or some other portable electronic communication device or appliance. The communication device 110 is configured for wired and/or wireless communications. In some embodiments, the communication device 110 is a smartphone or other computing device which may be configured to communicate over both public switched telephone network (PSTN) connections and wireless data connections. The communication device 110 can include one or more applications executing on a processor of the communication device 110 and operable to interact with the data center 120 and the call centers 130*a*, 130*b*. The communication device 110 can be in communication with the data center 120 via a data connection 112 and/or a server call 114. The communication device 110 is configured to communicate with call centers 130*a*, 130*b* via call center calls 116*a*, 116*b*. The server call 114 and the call center calls 116*a*, 116*b* may each include one or a combination of cellular or PSTN connections, VoIP calls, or other audio or data sessions provided by a telephony service. The communication device 110 can further be operable to bridge or merge two or more calls, for example, a server call 114 and a call center call 116*a* or 116*b*. Although certain connections are described herein as PSTN connections, it will be appreciated that any of the PSTN connections described may be implemented as VoIP or other data connections in addition to or instead of PSTN for communicating calls to or from a communication device, without departing from the scope of the present disclosure. As used herein, a "session" generally refers to a series of communications between two or more devices or servers. A session may be associated with a session identifier. The session identifier may be included in messages exchanged to allow the session participants to associate specific messages with specific transactions. In this way, a server can concurrently manage calls for multiple communication devices by associating devices with a unique session identifier. Furthermore, the unique session identifier may allow interrupted calls to be reconnected based on a request including the unique session identifier.

The data center 120 can include one or more computing devices including processors and memory. The data center 120 includes one or more servers 122 and one or more data stores, such as the database 124. In some embodiments, the data center 120 can be a network-based and/or distributed network of computing devices. The computing devices of the data center 120 are configured for wired and/or wireless communications, for example, via one or more communication interfaces. The data center 120 is in communication with the communication device 110 via the data connection 112 and/or the server call 114. In some embodiments, the data center 120 can be configured to communicate directly with an affiliated call center 130*a* via a data connection. The data center 120 can be independent of an unaffiliated call center 130*b*. One or more software processes executing at the data center 120 are configured to receive and process data transmitted from the communication device 110 and to transmit data to the applications executing on the communication device 110. Software processes executing at the data center 120 may be configured to at least partially control functionality of the communication device 110, for example, by sending control messages to the communication device 110 and/or the application executing on the communication device 110.

The call centers 130*a*, 130*b* can be any telephone host system configured to receive phone calls over a PSTN connection. The call centers 130*a*, 130*b* can be affiliated with one or more third parties (e.g., merchants, product manufacturers, service providers, government entities, utilities, etc.). The call centers 130*a*, 130*b* can include any type of automated call handling system. Non-limiting examples of call handling systems used by the call centers 130*a*, 130*b* include interactive voice response (IVR), automated attendant, voice response unit (VRU), automatic call distributor (ACD), or other computer telephony integration (CTI) or computer-supported telecommunications applications (CSTA). In some aspects, an affiliated call center 130*a* can be configured to connect directly or indirectly to the data center 120 via the data connection 126. The data connection 126 may be configured to permit communication between the data center 120 and the call center 130*a*, but generally does not allow the data center 120 to control operations of the call center 130*a* or any components therein. For example, an affiliated call center 130*a* can be operated by a third party having an existing agreement with the operator of the system 100, such as for enhanced survey functionality. In some aspects, an unaffiliated call center 130*b* is not configured to interact with the data center 120. For example, an unaffiliated call center 130*b* may be any call center associated with an organization that has not established a relationship with the operator of the system 100. Thus, for the various unaffiliated call centers 130*b*, the system 100 interacts with the call center 130*b* through a call center call 116*b*. The data center 120 can be configured to connect the communication device 110 to any number of publicly accessible call centers 130*a*, 130*b*.

Figure 1B:
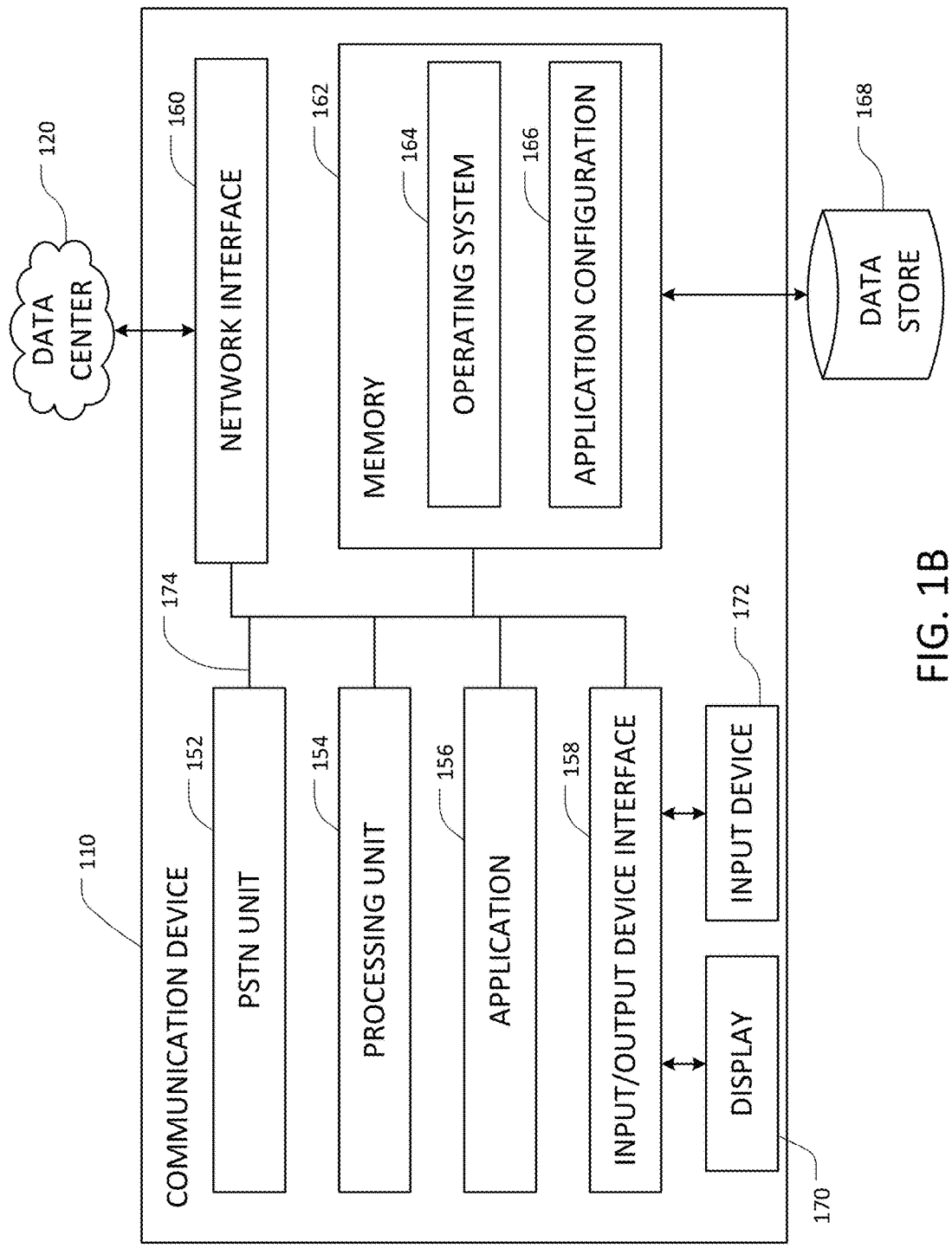
FIG. 1B is a block diagram of an illustrative communication device that may implement one or more of the telephone host system interaction features described.

FIG. 1B is a block diagram of an illustrative communication device that may implement one or more of the telephone host system interaction features described. For example, the communication device 110 may be configured to function as the communication device 110 depicted in FIG. 1A. The communication device 110 can be a smartphone, tablet, hand held computing device, portable computing device, or other computing device. The communication device 110 may include a PSTN unit 152, a processing unit 154, an application 156, an input/output device (I/O) interface, a network interface 160, and a memory 162. The memory 162 may include an operating system 164 and an application configuration 166 associated with the application 156. The input/output device interface 158 is configured to interact with a display 170 or other output device (e.g., a microphone) and an input device 172. The memory 162 may further be in communication with an external data store 168. The network interface 160 can be configured to communicate with the data center 120 as depicted in FIG. 1A.

The PSTN unit 152 can provide connectivity to a PSTN network for phone call functionality. For example, the PSTN unit 152 can enable the communication device 110 to initiate a server call 114 and/or call center calls 116*a*, 116*b*, which may further include connecting to a VoIP provider. In some implementations, the connection to the PSTN network through the PSTN unit 152 may be via a cellular communications network (e.g., long term evolution (LTE) networks, global system for mobile communications (GSM) networks, code-division multiplex access (CDMA) networks, or the like) or a satellite communications network (e.g., broadband global area network (BGAN) or the like). In such instances, the communications network may provide access to the PSTN through a gateway. In some embodiments, the device may or may not include a PSTN unit 152 or other capability to connect with PSTN, and may conduct some or all calling functionality using VoIP, rather than PSTN calling.

The processing unit 154 can receive information and instructions from other computing systems or services via the network interface 160. The network interface 160 can also store data directly to the memory 162. The processing unit 154 can communicate to and from the memory 162 and output information to a display 170 via the input/output device interface 158. The input/output device interface 158 can also accept input from the input device 172, such as a touch screen, GUI, keyboard, mouse, digital pen, microphone, mass storage device, etc. In some embodiments, a single touchscreen interface can be the input device 172 and the display 170.

The memory 162 includes computer program instructions that the processing unit 154 executes in order to implement one or more embodiments described herein. The application 156 is configured to perform some of the processes associated with the communication device 110 as described herein.

In some embodiments, the application 156 may be executed at least partially on the processing unit 154. The memory 162 may include random access memory (RAM), read only memory (ROM), and/or other persistent, non-transitory computer readable media. The memory 162 can store an operating system 164 that provides computer program instructions for use by the processing unit 154 or other elements included in the communication device 110 in the general administration and operation of the communication device 110. The memory 162 can further include computer program instructions and other information for implementing aspects of the present disclosure. For example, in some embodiments, the memory 162 includes an application configuration 166. The application configuration 166 may include instructions or other data for use in the execution of any of the telephone host system interaction processes described herein, which may be executed at the processing unit 154 or application 156.

The memory 162 may also include or communicate with one or more auxiliary data stores, such as data store 168. The data store 168 may electronically store data regarding one or more users or user accounts associated with the communication device 110, or other information for execution of the application 156. In some embodiments, the data store may store caller information for a calling party that may use the communication device. Some caller information may include generic caller information, such as a name, address, telephone number, date of birth, social security number or a portion thereof, or other information corresponding to the calling party that is not specific to a particular service provider. Other caller information may include provider specific caller information, such as account numbers or other account identifiers, transaction or order identifiers, service request identifiers, information regarding previous interactions with the service provider, or any other information associated with the calling party and the service provider. As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service The elements included in the communication device 110 may be coupled by a bus 174. The bus 174 may be a data bus, communication bus, or other bus mechanism to enable the various components of the communication device 110 to exchange information.

In some embodiments, the communication device 110 may include additional or fewer components than are shown in FIG. 1B. For example, a communication device 110 may include more than one processing unit 154 or memory 162. In another example, the communication device 110 may not be coupled to a display 170 (e.g., if the communication device 110 is a smart speaker device or the like).

Automated Interaction with a Telephone Host System

Figure 2A:
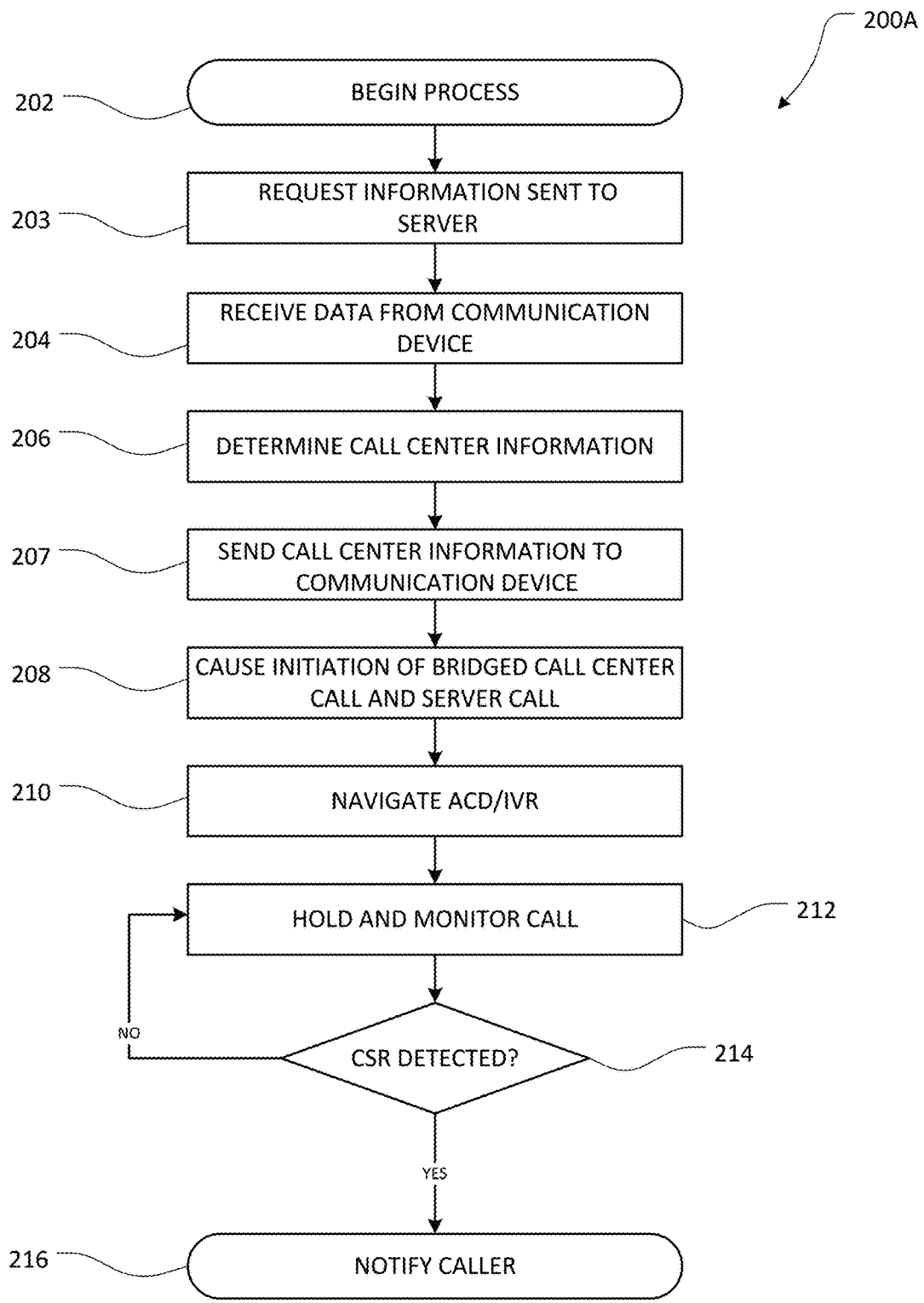
FIGS. 2A and 2B are flow diagrams depicting example methods of automated interaction with a telephone host system.
Figure 2B:
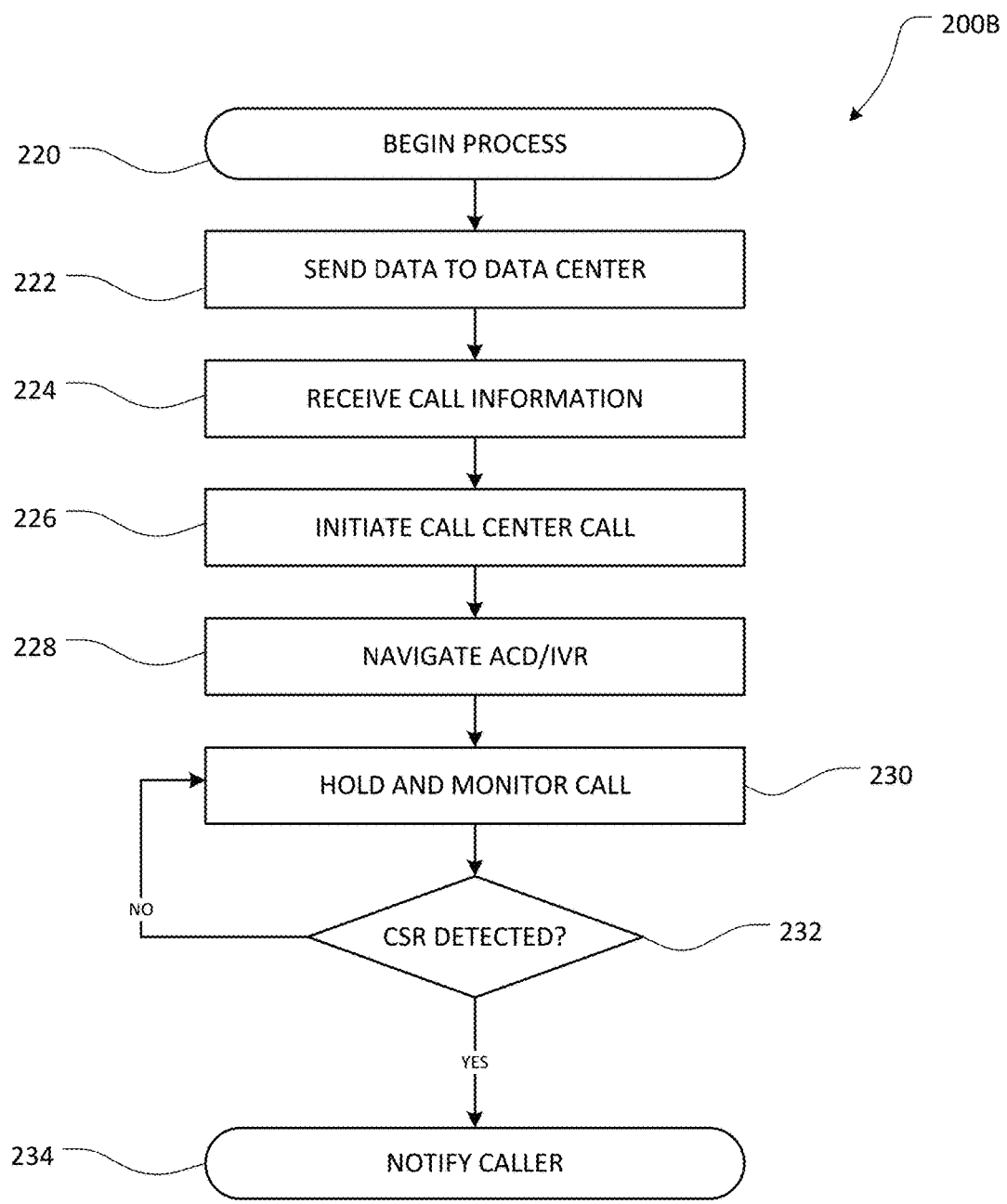

FIGS. 2A and 2B are flow diagrams depicting example methods 200A, 200B of automated interaction with a telephone host system. The method 200A depicted in FIG. 2A is an example method using a three-way call (e.g., bridged or merged calls) between the communication device 110, the data center 120, and the call center 130*a*, 130*b*. The method 200B depicted in FIG. 2B is an example method in which a relatively larger portion of the processing occurs at the communication device 110, using a two-way call center call.

Referring to FIG. 2A, the method 200A may begin at block 202 when a user initiates a request at a communication device 110. For example, the user may select, through an application 156 executing on the communication device 110, an option for a particular type of customer service, such as bank account assistance, a telephone assistance line associated with a product owned by the user, or the like. At block 203, the communication device 110 can send the request and/or information associated with the request to the data center 120. For example, the communication device 110 can send the data input by the user (e.g., an audio recording of a conversational input from the user, a text input received from the user, an option selected by the user from a menu, etc.) and/or other information derived based on the user input (e.g., a phone number, username account number, unique ID for the service provider, etc.), to the data center 120 where the data is received. At block 204, the system 100 receives data from the communication device 110.

At block 206, call center information is determined based on the received data. In some embodiments, the communication device 110 may determine a call center 130a, 130b, and/or a division or call path within a call center 130a, 130b that the user should be connected to, based on the user request. Call center information indicating the call center 130a, 130b, division, or call path can then be transmitted to the data center 120. Alternatively, the call center information can be determined at the data center 120 based on the user input and/or associated information received from the communication device 110. Determining the call center information at block 206 can include, for example, looking up call information in the database 124 based on information in the user request. In some embodiments, the call center information may be determined and/or modified based on information associated with the user, such as the user's current location or area code, account information, status (e.g., association with a VIP number for preferred service), and/or type of user request (e.g., a particular department or division with a service provider). In some embodiments, further information may be obtained based on the user request. For example, the system may determine if the request was a frequent request from the user and/or an easily solvable request that may not require a call to a call center. In response to such determination, the user may be directed to an alternative solution (e.g., a customer service website or the like) in addition to or instead of placing a call to the call center. At block 207, the data center 120 can send some or all of the call center information to the communication device 110, for example, over a data connection.

At block 208, the server causes initiation of a call center call and a server call. Block 208 may include the data center 120 sending an instruction to the communication device 110 to initiate a call to a targeted call center 130a, 130b. In some embodiments, the data center 120 may additionally send an instruction to the communication device 110 to initiate the server call to the server, or an application executing on the communication device 110 may be configured to initiate a server call each time a call center call is initiated. Based on the instruction, the communication device 110 initiates the call center call and the server call. The call center call can be initiated via the PSTN network to a phone number associated with the call center 130a, 130b. The server call can be initiated via the PSTN network to a phone number associated with a communication gateway of the data center 120. The communication device 110 can further bridge or merge the call center call and the user call such that the communication device 110, the data center 120, and the call center 130a or 130b are connected in a three-way call. Thus, audio transmitted from the communication device 110, the data center 120, or the call center 130a or 130b is transmitted to each of the other two parties. The call center call and the server call may be maintained in a background or muted mode at the communication device 110 such that audio can be transmitted between all three parties to the bridged call, but is not played at a speaker of the communication device 110. Thus, a caller using the communication device 110 may use the communication device 110 for other functions and/or leave the communication device 110 unattended until a live agent is available.

At block 210, an automatic call distributor (ACD), interactive voice response (IVR) system, or other automated call handling system is navigated. For example, the navigation at block 210 can include receiving and responding to one or more audible prompts. Because the server call and the call center call are bridged at the communication device 110, any audio signals such as ACD or IVR prompts transmitted via the call center call from the call center 130a, 130b are received at the data center 120 via the server call. At the data center 120, the audio signal received from the call center 130a, 130b is analyzed, for example, based on a waveform analysis or other audio signal analysis, to determine the content of the audio signal. In one example, the data center 120 is configured to determine, based on the audio signal, whether the call center is producing a ringing tone, hold music, or a spoken message, or whether a live agent has answered the call center call. If a spoken message is detected, the data center can further use waveform analysis and/or natural language processing methods (e.g., automatic speech recognition, comparison of received audio to predetermined samples, detecting changes in volume level, ring back sounds, etc.) to determine if the spoken message is an advisory message (e.g., "please continue holding") or a prompt for user input (e.g., "say your first and last name," "enter your account number," etc.).

In some embodiments, the ACD/IVR system may be navigated directly by the data center 120 providing responses via the bridged call. In other embodiments, the data center 120 can cause the communication device 110 to provide the responses to the ACD/IVR system. For example, the data center 120 may receive one or more prompts, determine a response, and send data indicating the response (e.g., an audio recording, an identification of an audio recording stored at the communication device 110, a data representation of a response to be converted to an audio representation at the communication device 110, etc.) to the communication device 110 via a separate data connection 112. The communication device 110 in turn receives the data from the data center 120 and provides the appropriate response to the call center 130a, 130b via the call center call.

In some embodiments, the system 100 may have pre-existing information regarding the structure of the ACD/IVR system. For example, the system 100 may have determined a sequence of prompts that are asked of each caller, e.g., based on prompts received in previous call center call flows, or based on one or more test calls placed independent of a caller request for the purpose of mapping the ACD/IVR tree. If the structure of the ACD/IVR system is known, the data center 120 may provide a response (e.g., an audible representation of a verbal response to the prompt, dual-tone multi-frequency (DTMF) signal, or the like) without receiving and analyzing the full prompt.

When the ACD/IVR navigation reaches a target, such as an indication that the call center call will be directed to a live agent (e.g., a customer service representative), the call center call is held and monitored at block 212. Because call centers frequently receive calls at a greater rate than they can be answered by live agents, the call center call may be placed on hold at the call center. The system 100 monitors the held call by receiving the audio sent by the call center via the call center call.

At decision state 214, the system 100 periodically determines if a customer service representative or other live agent is detected. For example, the server 122 can continuously or periodically analyze the audio received from the call center 130*a*, 130*b* via the bridged call center call and server call, to determine the content of the audio. If the system 100 determines that the received audio signal is a hold message or hold music, the system 100 can determine that a live agent has not been detected, and the method 200A returns to block 212 to continue monitoring the held call. If the system 100 determines at decision state 214 that the received audio signal is a voice of a live agent, rather than a recording, or if the received audio signal is a ringing tone or other sound indicating that a live agent will pick up the call shortly, the system 100 can determine that a live agent has been detected. When a live agent is detected, the method 200A continues to block 216.

At block 216, the caller is notified that the live agent is available. For example, the communication device 110 may transition the call center call and/or the bridged call center call and server call from the background or muted mode to an unmuted or active mode such that words spoken by the live agent or other audio content from the call center 130*a*, 130*b* is played audibly by a speaker of the communication device 110. In some embodiments, the data center 120 may cause the transition by sending a control message to the communication device 110 to cause the communication device 110 to unmute the call. The control message may be, for example, a data communication sent via the data connection 112, or an audio transmission sent via the server call (e.g., a DTMF tone or other signal receivable at the communication device 110). In some embodiments, the control message may further cause the communication device 110 to enter a speaker mode, as is described in further detail below. When the caller has been notified of the available live agent, the method 200A terminates. In some embodiments, the communication device 110 can terminate the server call after the live agent answers, for example, after the caller is notified or after the system 100 determines that the caller has picked up the communication device 110. In other embodiments, the server call may be maintained, for example, if the interaction between the caller and the call center is to be recorded at the data center.

Referring now to FIG. 2B, the method 200B may begin at block 220 when a user initiates a request at a communication device 110. For example, the user may select, through an application 156 executing on the communication device 110, an option for a particular type of customer service, such as bank account assistance, a telephone assistance line associated with a product owned by the user, or the like. At block 222, the communication device 110 sends data associated with the request to the data center 120. For example, the communication device 110 can send the data input by the user, and/or other information derived based on the user input (e.g., a phone number, username account number, unique ID for the service provider, etc.), to the data center 120 where the data is received.

At block 224, call information is received at the communication device 110 from the data center 120. The call information may be determined at the data center 120 based on the received data. For example, the data center 120 may determine call information including call center information and call flow information. The call center information may include a phone number, a uniform resource identifier (e.g., session initiation protocol (SIP) endpoint address), or other identifying information to establish communications with the call center 130*a*, 130*b*. The call flow information may include information to be used by the communication device 110 when interacting with the call center 130*a*, 130*b*. For example, the call flow information may include one or more maps of an IVR tree or portions of an IVR tree known to be used at the call center 130*a*, 130*b*, data indicating one or more responses to be provided to the call center 130*a*, 130*b* in response to IVR prompts received via the call center call, etc. In some embodiments, the call flow information may include an endpoint within the IVR tree, such as a particular extension or branch of the IVR tree to be targeted. Determining the call information at block 206 can include, for example, looking up call information in the database 124 based on information in the user request. In some embodiments, the call information may be determined and/or modified based on information associated with the user, such as the user's current location or area code, account information, status (e.g., association with a VIP number for expedited service), and/or type of user request (e.g., a particular department or division with a service provider). In some embodiments, further information may be obtained based on the user request. For example, the system may determine if the request was a frequent request from the user and/or an easily solvable request that may not require a call to a call center. In response to such determination, the user may be directed to an alternative solution (e.g., a customer service website or the like) in addition to or instead of placing a call to the call center.

At block 226, the communication device 110 initiates a call center call based at least in part on the received call information. For example, the application executing on the communication device 110 may cause the communication device 110 to initiate the call center call in response to receiving the call information. The call center call may be maintained in a background or muted mode at the communication device 110 such that audio can be transmitted between the communication device 110 and the call center 130*a*, 130*b*, but is not played at a speaker of the communication device 110. Thus, a caller using the communication device 110 may use the communication device 110 for other functions and/or leave the communication device 110 unattended until a live agent is available, while an autonomous process (e.g., the application executing on the communication device 110) handles the call center call.

At block 228, an automatic call distributor (ACD), interactive voice response (IVR) system, or other automated call handling system is navigated from the communication device 110. For example, the navigation at block 228 can include receiving and responding to one or more audible prompts. At the communication device 110, the audio signal received from the call center 130*a*, 130*b* may be analyzed, for example, based on a waveform analysis or other audio signal analysis, to determine the content of the audio signal. In one example, the communication device 110 is configured to determine, based on the audio signal, whether the call center is producing a ringing tone, hold music, or a spoken message, or whether a live agent has answered the call center call. If a spoken message is detected, the data center can further use waveform analysis and/or natural language processing methods (e.g., automatic speech recognition, comparison of received audio to predetermined samples, detecting changes in volume level, ring back sounds, etc.) to determine if the spoken message is an advisory message (e.g., "please continue holding") or a prompt for user input (e.g., "say your first and last name," "enter your account number," etc.).

In some embodiments, the system 100 may have pre-existing information regarding the structure of the ACD/IVR system. For example, the system 100 may have determined a sequence of prompts that are asked of each caller, e.g., based on prompts received in previous call center call flows, or based on one or more test calls placed independent of a caller request for the purpose of mapping the ACD/IVR tree. If the structure of the ACD/IVR system is known, the data center 120 may send such information to the communication device 110 with the call information at block 224, such that the communication device 110 can provide a response (e.g., an audible representation of a verbal response to the prompt, dual-tone multi-frequency (DTMF) signal, or the like) without receiving and analyzing the full prompt.

When the ACD/IVR navigation reaches a target, such as an indication that the call center call will be directed to a live agent (e.g., a customer service representative), the call center call is held and monitored at block 230. Because call centers frequently receive calls at a greater rate than they can be answered by live agents, the call center call may be placed on hold at the call center. The communication device 110 and/or the application executing thereon monitors the held call by receiving the audio sent by the call center via the call center call.

At decision state 232, the communication device 110 periodically determines if a customer service representative or other live agent is detected. For example, the application executing on the communication device 110 can continuously or periodically analyze the audio received from the call center 130*a*, 130*b* via the call center call to determine the content of the audio. If the communication device 110 determines that the received audio signal is a hold message or hold music, the communication device 110 can determine that a live agent has not been detected, and the method 200B returns to block 230 to continue monitoring the held call. If the communication device 110 determines at decision state 232 that the received audio signal is a voice of a live agent, rather than a recording, or if the received audio signal is a ringing tone or other sound indicating that a live agent will pick up the call shortly, the communication device 110 can determine that a live agent has been detected. When a live agent is detected, the method 200B continues to block 234.

At block 234, the caller is notified that the live agent is available. For example, the communication device 110 may transition the call center call from the background or muted mode to an unmuted or active mode such that words spoken by the live agent or other audio content from the call center 130*a*, 130*b* is played audibly by a speaker of the communication device 110. In some embodiments, the transition may be initiated by the application sending a control message to an input/output device interface or other component of the communication device 110 to cause the communication device 110 to unmute the call. In some embodiments, the communication device 110 may further enter a speaker mode, as is described in greater detail below. When the caller has been notified of the available live agent, the method 200B terminates.

Figure 2C:
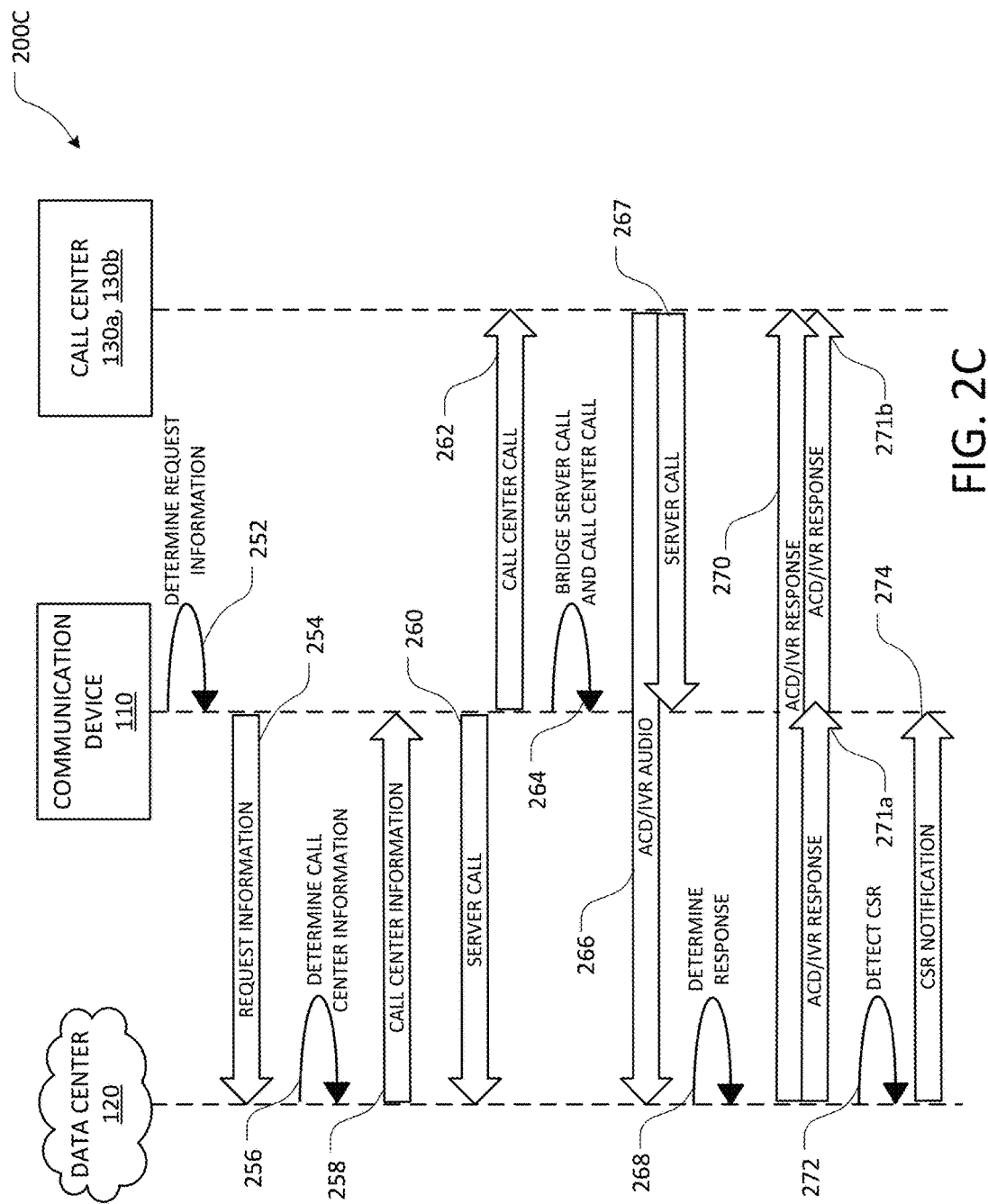
FIGS. 2C-2E are interaction flow diagrams depicting example methods of automated interaction with a telephone host system.
Figure 2D:
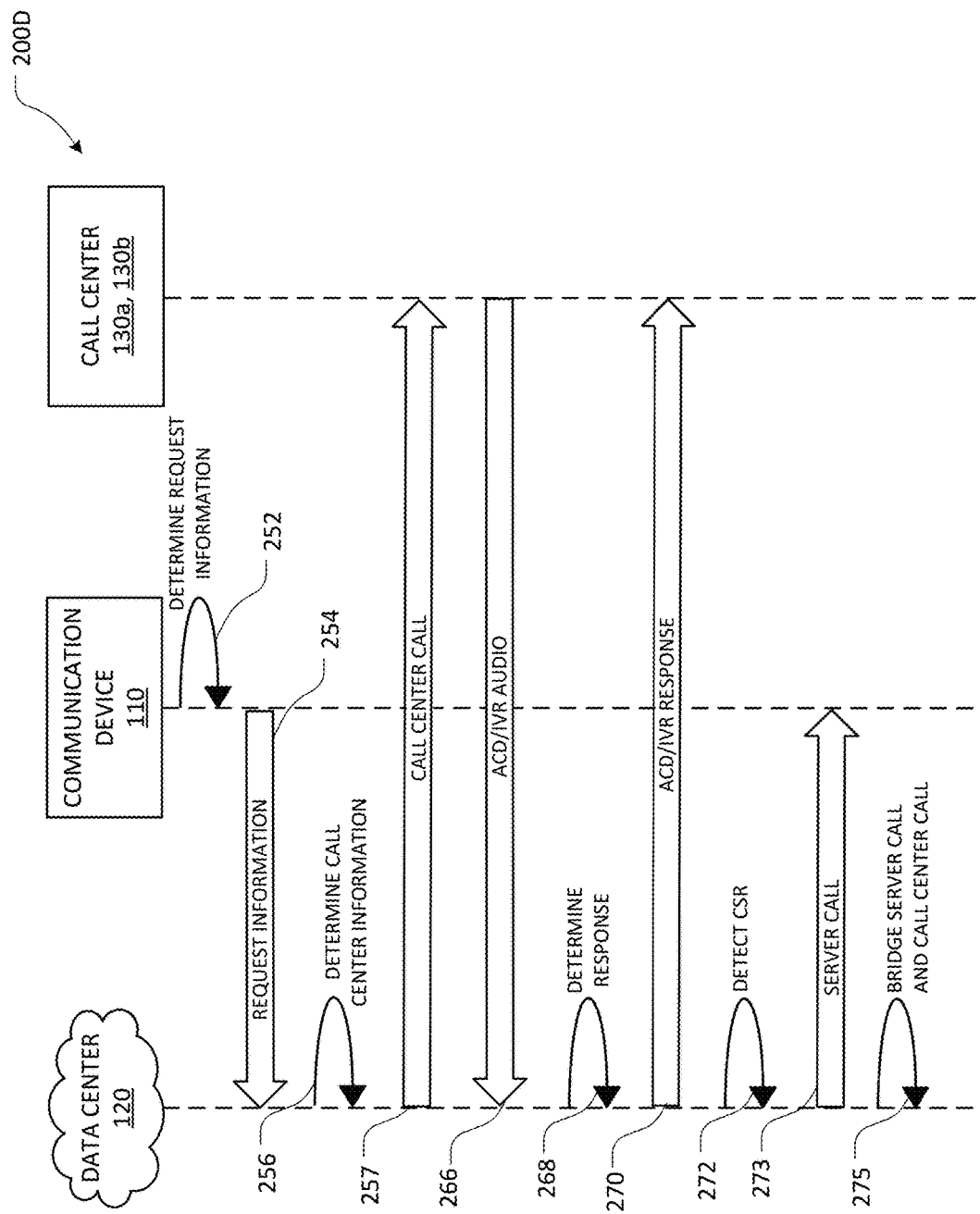
Figure 2E:
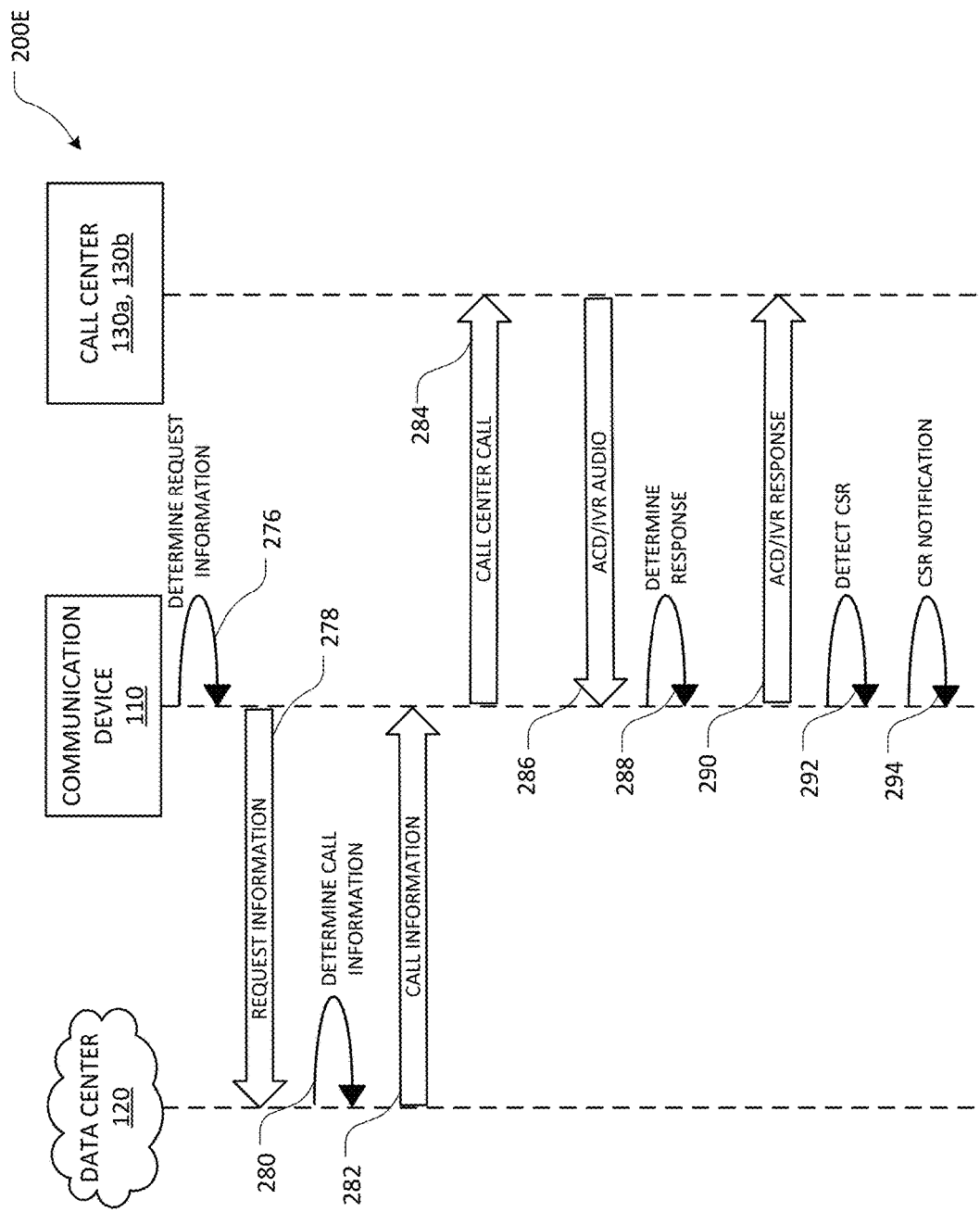

FIGS. 2C-2E are interaction flow diagrams illustrating interactions and processing operations corresponding to methods 200A and 200B. The interaction flow 200C depicted in FIG. 2C is an example method using a three-way call (e.g., bridged or merged calls) between the communication device 110, the data center 120, and the call center 130*a*, 130*b*, corresponding to method 200A. The interaction flow 200D depicted in FIG. 2D is an alternative implementation of interaction flow 200C, in which the call center call occurs between the data center 120 and the call center 130*a*, 130*b* without the communication device 110 as an intermediary. The interaction flow 200E depicted in FIG. 2E is an example method in which a relatively larger portion of the processing occurs at the communication device 110, using a two-way call center call. The interaction flow diagrams of FIGS. 2C-2E illustrate how the systems and methods of the present disclosure may advantageously improve efficiency of interaction with call centers, without requiring any control or modification of the call center, or any components thereof, by the communication device 110 or data center 120.

Referring to FIG. 2C, the interaction flow 200C corresponds to the three-way call method of FIG. 2A. The interaction flow 200C may begin, for example, after a request is received from a user at the communication device 110. In processing operation 252, request information corresponding to the request is determined at the communication device 110. As described above with reference to block 202, the request information is sent from the communication device 110 to the data center 120 in interaction 254. In processing operation 256, call center information is determined at the data center 120 as described above with reference to block 206. In interaction 258, the call center information is sent from the data center 120 to the communication device 110 as described above with reference to block 207.

Responsive to receiving the call center information, the communication device 110 initiates a server call from the communication device 110 to the data center 120 at interaction 260, and initiates a call center call from the communication device 110 to the call center 130*a*, 130*b* at interaction 262. The server call may include any one or combination of the types of communications described herein as a call. In processing operation 264, the communication device causes the server call and the call center call to be bridged such that audio may be transmitted between the communication device 110, the data center 120, and the call center 130*a*, 130*b*. In various implementations, the server call may be initiated before the call center call, the call center call may be initiated before the server call, or the server call and the call center call may be initiated simultaneously. In some embodiments, initiation of either or both of the call center call and the server call may occur with an intentional or unintentional time delay without departing from the scope of the methods described herein.

As described above with reference to block 210, the data center 120 navigates any ACD or IVR system of the call center 130*a*, 130*b*. As discussed, the data center 120 may navigate an ACD or IVR system established by a call center. The ACD or IVR system is not established or defined by the data center. At interactions 266 and 267, an audio transmission associated with the ACD or IVR system is sent from the call center 130*a*, 130*b* to the data center 120 and the communication device 110 over the bridged server call and call center call. At processing operation 268, the data center 120 determines a response to the audio transmission. At interaction 270, the data center 120 sends the determined response to the call center 130*a*, 130*b* by transmitting an audio representation of the response over the bridged server call and call center call. Alternatively, at interaction 271*a*, the data center 120 may send the determined response to the communication device 110, and the communication device 110 may in turn send the response received from the data center 120 to the call center 130a, 130b at interaction 271b. The interactions/processing operations 266, 267, 268, 270, 271a, and/or 271b may be repeated any number of times until the data center 120 detects a live agent, such as a customer service representative as described elsewhere herein, at processing operation 272. At interaction 274, the data center 120 sends a message to the communication device 110 to notify the communication device 110 and/or the user that a live agent is available.

With reference to FIG. 2D, the interaction flow 200D is a variation of the interaction flow 200C, in which the data center 120 navigates an ACD/IVR system over a call center call between the data center 120 and the call center 130a, 130b without the communication device 110 as an intermediary. Accordingly, in interaction flow 200D, after the call center information is determined at processing operation 256, the data center 120 causes initiation of a call center call between the data center 120 and the call center 130a, 130b at interaction 257. The call center call may be a direct call (e.g., via PSTN, VoIP, etc.) and/or may include causing a telephony service (not shown) to initiate the call center call. At interaction 266, the data center 120 receives ACD/IVR audio from the call center 130a, 130b over the call center call. After determining a response to the ACD/IVR audio at processing operation 268, the data center 120 transmits the response over the call center call to the call center 130a, 130b at interaction 270. After the data center 120 detects a live agent at processing operation 272, the data center 120 causes initiation of a server call between the data center 120 and the communication device 110. At processing operation 275, the call center call and the server call are bridged (e.g., at the data center 120 and/or at a telephony service) such that a user of the communication device 110 can speak to the live agent over the bridged call center call and server call.

Referring now to FIG. 2E, the interaction flow 200E corresponds to the two-way call method of FIG. 2B. The interaction flow 200E may similarly begin after a request is received from a user at the communication device 110. In processing operation 276, request information corresponding to the request is determined at the communication device 110. As described above with reference to block 222, the request information is sent from the communication device 110 to the data center 120 in interaction 278. In processing operation 280, call information is determined at the data center 120. In interaction 282, the call information is sent from the data center 120 to the communication device as described above with reference to block 224. Responsive to receiving the call information, the communication device 110 initiates a call center call from the communication device 110 to the call center 130a, 130b at interaction 284.

As described above with reference to block 228, the communication device 110 navigates any ACD or IVR system of the call center 130a, 130b. In interaction 286, the call center 130a, 130b sends one or more audio transmissions associated with an ACD or IVR system in use at the call center 130a, 130b, from the call center 130a, 130b to the communication device 110 over the call center call. At processing operation 288, the communication device 110 determines a response to the audio transmission. At interaction 290, the communication device 110 sends the determined response to the call center 130a, 130b by transmitting an audio representation of the response over the call center call. Operations 286, 288, and 290 may be repeated any number of times until the communication device 110 detects a live agent, such as a customer service representative as described elsewhere herein, at processing operation 292. At processing operation 294, the communication device 110 notifies the user that the live agent is available, for example, by producing an audio or visual alert, playing audio from the call center call, etc.

In some embodiments, a system 100 may be configured for operation in accordance with either method 200A or method 200B (and corresponding interaction flows 200C-200E). In other embodiments, a relatively versatile system may be configured to operate in accordance with both method 200A and 200B. For example, such a versatile system may include one or more communication devices 110 capable of simultaneously communicating with the data center 120 via an audio session (a VoIP call, cellular/PSTN call, etc.) and a data connection. In addition, the communication devices 110 may have sufficient processing power to carry out some or all of the audio processing functions of the methods 200A, 200B. In such embodiments, the system 100 may further be configured for dynamic mode selection, in which the data center 120 and/or the communication device 110 can optionally select between the trilateral functionality of method 200A and the bilateral functionality of method 200B for an individual caller request, based on one or more criteria. Non-limiting examples of such criteria include network latency between the data center and the communication device, the identity of the call center, call flow information such as a particular type of IVR tree or branch of the IVR tree at the call center, a characteristic of the communication device 110 (e.g., an available amount of processing or memory resources, capability for bridging calls or maintaining a data connection while calling, or other capability or characteristic of the communication device 110), and the type of request (e.g., whether the call is a request for information, a request to report a problem, etc.). When a method is selected, the data center 120 may send a control message or other instruction to the communication device 110 or an application executing thereon, indicating the method to be used.

Decisions regarding the call flow method to be used for a particular caller request may be made at the data center 120 (e.g., at the server 122) when the request information is received from the communication device 110 at block 204 or 222. In a first example, the data center 120 receives a request for a service call from a communication device 110 via a network data connection determined to have relatively high latency. Because high latency may cause delays in communications between the data center 120 and the communication device 110, the data center 120 may determine that the caller request should be fulfilled using the bilateral method 200B. In method 200B, the communication device 110 primarily interacts with the call center, only occasionally requiring communication with the data center 120 during the call center call. Accordingly, any disruption due to the high network latency can be mitigated and, if the call is to be recorded, the recording may be stored at the communication device 110 and uploaded to the data center 120 slowly or at a later time when latency is lower.

In another example of dynamic mode selection, the data center 120 receives a request for a service call corresponding to a call center known to have frequently changing IVR prompts or a complex IVR tree. Accordingly, the data center 120 may select method 200A for completion of the call flow, as the data center 120 may have greater processing resources available to navigate a host system that differs from an expected IVR tree. Other criteria that may cause the data center 120 to select the trilateral, data center-driven method 200A can include processing capabilities of the communication device 110, for example, if the communication device 110 would likely have insufficient processing and memory resources for the natural language processing, speech-to-text, or other processes associated with method 200B. Alternatively, the data center 120 may select the bilateral, communication device-driven method 200B for requests from a communication device 110 having relatively robust processing and memory resources, and/or where the request corresponds to a data center with a relatively simple IVR tree or a data center that does not require navigation of an IVR tree.

In yet another example of dynamic mode selection, the data center 120 receives a request for a service call and determines that the trilateral method 200A will be used to complete the request. The data center 120 may then further determine whether the server call should be a cellular/PSTN call or a VoIP call. For example, the data center 120 may select between a cellular/PSTN server call and a VoIP server call based on communication latency, preset caller preferences, the location of the communication device 110, etc. In addition, if the call will be recorded, the data center 120 may determine whether the call should be recorded locally at the communication device 110 or remotely at the data center 120 (e.g., at decision state 604 of FIG. 6).

Natural Language Processing

Figure 3:
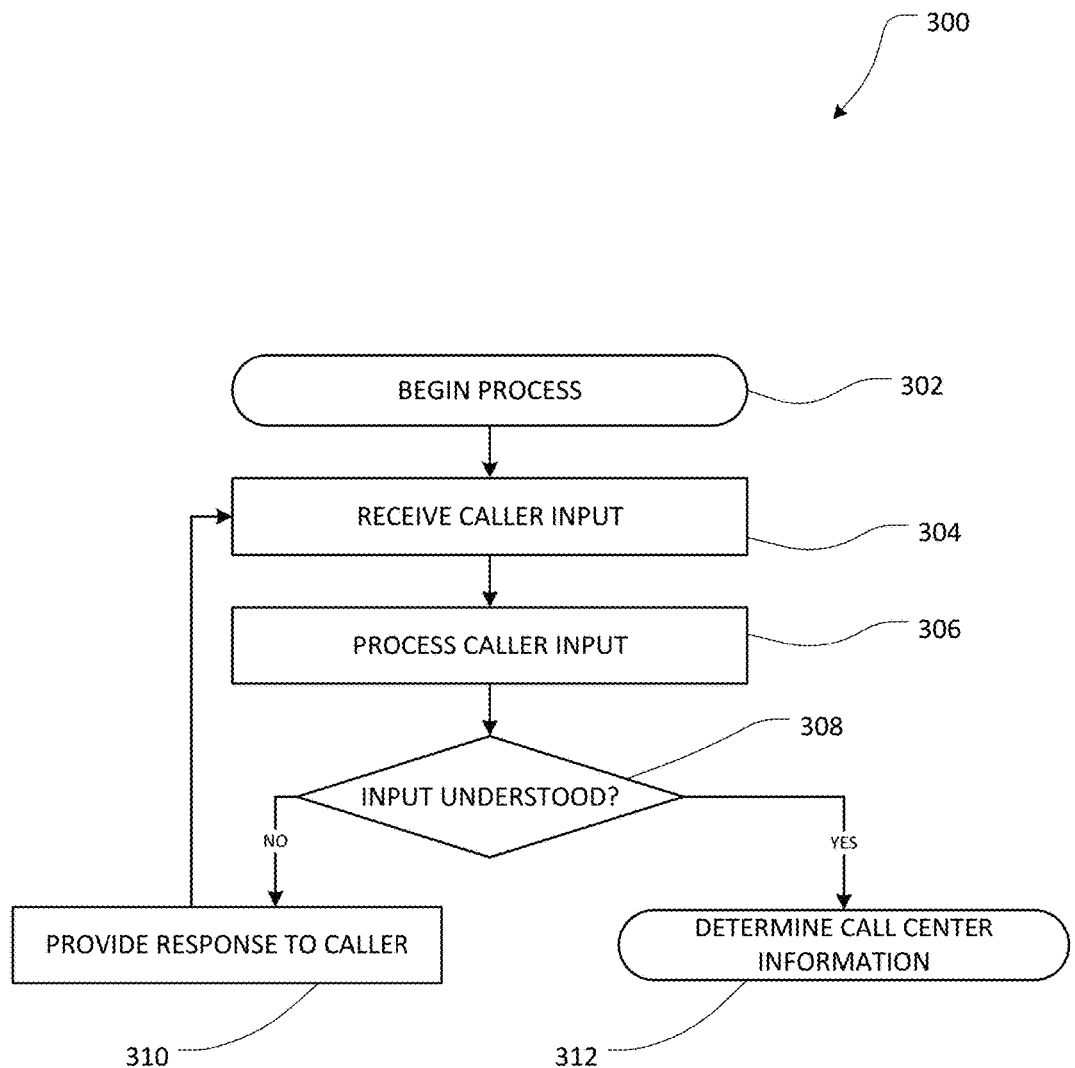
FIG. 3 is a flow diagram depicting an example method of initiating an interaction with a telephone host system using natural language processing.

FIG. 3 is a flow diagram depicting an example method of initiating an interaction with a telephone host system using natural language processing based on a spoken request received from a caller. In various embodiments, the method 300 can be performed entirely at the communication device 110, entirely at the data center 120, or by a combination of components at the communication device 110 and the data center 120. The method 300 begins at block 302 when a caller initiates a request at the communication device 110. For example, the caller may select an option from a menu presented on a graphical user interface (GUI) of the communication device 110 (e.g., a GUI as depicted in FIGS. 11A-11D). In another example, the caller may initiate the request by providing a spoken request to a virtual assistant, intelligent personal assistant, or similar program executing on the communication device 110. In yet another example, if the communication device 110 does not include virtual assistant functionality, the caller may select an option to record and send a spoken request from the communication device 110 to the data center 120 for processing. Non-limiting examples of caller inputs include requests such as "I need to speak to my wireless carrier about a problem with my bill," "I want to request a refund for the sunglasses I ordered," "I need to reschedule my flight to Boston," "I need to tell my utility company about a power outage," etc.

At block 304, the caller input is received at the location where it will be processed. For example, the caller input may be received at the communication device 110 from an input component of the communication device 110, or may be received at the data center 120 from the communication device 110. In one example, the communication device 110 can transmit the caller's natural language input to the data center 120, where it is received for processing. In some embodiments, a virtual assistant can initially process the caller input to determine that the caller input is a request to speak to a customer service representative or other live agent at a call center. Based on the determination that the caller input is a request to speak to a live agent, the virtual assistant program causes the communication device 110 to transmit a digital representation of the spoken request to the data center 120.

At block 306, the caller input is processed using one or more natural language processing methods to determine the content of the request. For example, the caller input can be analyzed to determine the name of a company or other entity the caller wishes to call, and to further determine the type of service requested (e.g., the system 100 can determine the name of the airline and that the caller wishes to make a change to an existing reservation, etc.). When the caller input has been processed, the method continues to decision state 308, where the system determines if the caller input was understood. In some cases, a caller input may not be understood, for example, if the caller did not speak clearly, if the caller phrased the question in a way that the natural language processing algorithm was not able to determine the substantive content of the request, if the call center entity was not able to be understood or recognized, if the caller made an ambiguous request such that additional information is required, or the like.

If the natural language processing algorithm is not able to determine a call center or routing within the call center based on the caller input, the input is not understood and the method 300 continues to block 310, where a response is provided to the caller (e.g., "please repeat your request," "which airline?" or the like). After the response is provided to the caller, the method 300 returns to block 304 when a subsequent caller input is received, and the subsequent input is processed at block 306.

If the natural language processing algorithm is able to determine a call center or routing within the call center based on the caller input, decision state 308 is affirmative (e.g., the input is understood), and the method 300 continues to block 312, where call center information is determined. For example, the data center 120 can determine an entity to call, a phone number associated with the entity, and/or information related to past calls to the call center. Some or all of the call center information may be retrieved from the database 124, or may be retrieved from a networked service, such as by performing a search using a search engine. When the call center information has been determined the method 300 terminates and a call may be initiated to the call center based on the call center information, as described above with reference to block 208 in FIG. 2.

Automatic Speaker Mode

Figure 4:
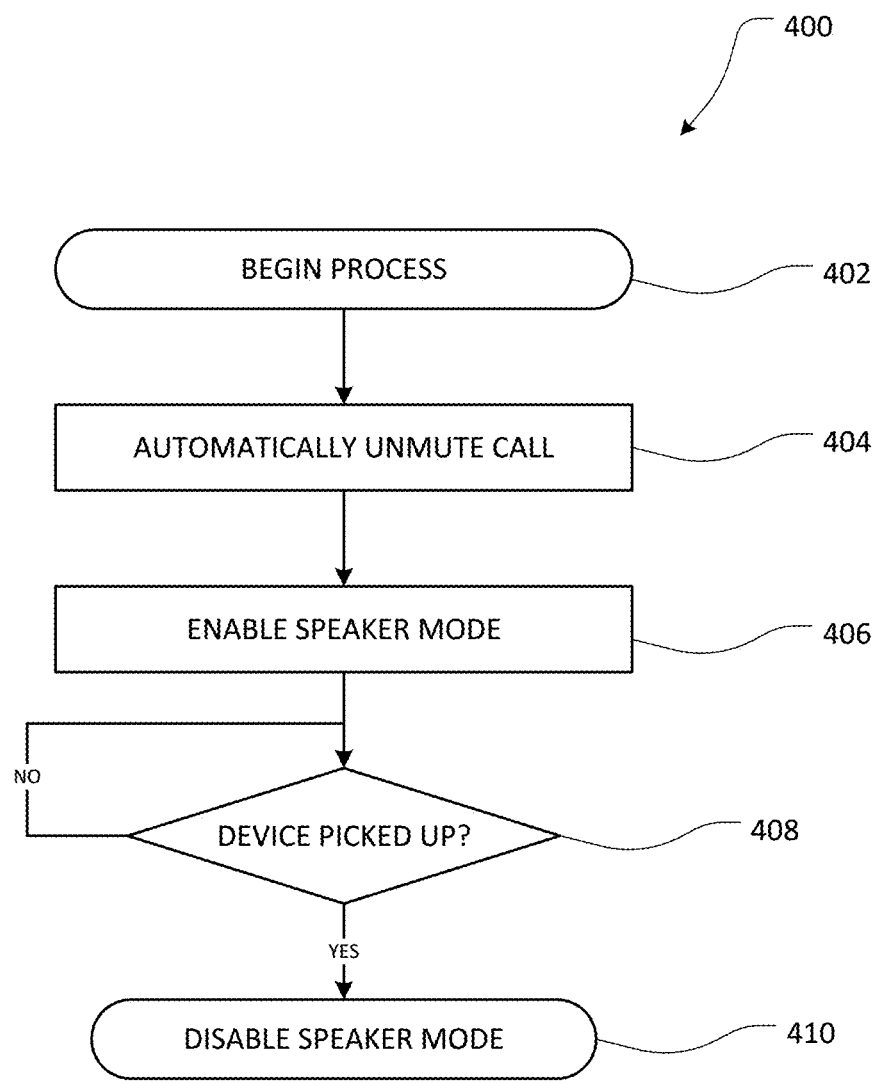
FIG. 4 is a flow diagram depicting an example method of user notification.

FIG. 4 is a flow diagram depicting an example method of user notification with automatic speaker mode functionality. The method 400 can be advantageous if a caller wishes to speak to a live agent, but does not wish to take the time to navigate an ACD/IVR system or wait on hold. For example, the caller may provide an initial request via caller input as described above, and the application 156 on the communication device 110 may indicate that the caller will be notified when the desired call has been set up. The method 400 can allow the caller to be notified when a live agent has been reached without requiring the caller to actively monitor the communication device 110. The method 400 can be implemented at a communication device 110, such as a smartphone, configured to operate alternately in a speaker mode (e.g., speaker phone or other loudspeaker mode) and a handset mode. In the speaker mode, audio received from a call is played at a louder volume relative to the handset mode. For example, the handset mode may play audio at a range of volumes appropriate when a speaker of the communication device is adjacent to or near to a user's ear, while the speaker mode may play audio at a louder volume appropriate when the communication device is relatively farther from the user's ear (e.g., 6 inches, 1 foot, 2 feet, 3 feet, or more). In some embodiments, the communication device 110 may include separate speakers for the handset and speaker modes, or may utilize a single speaker or set of speakers at different volumes. The communication device 110 may be executing an application associated with and configured to interact with the data center 120.

The method 400 begins at block 402 when a live agent is detected in the call center call. For example, the live agent may be detected by natural language processing or other audio processing at the communication device 110 and/or at the data center 120. At block 404, the call center call is automatically unmuted. For example, the application 156 may cause the communication device 110 to automatically unmute the call center call based on the determination that the live agent has answered, and/or based on a control message received from the data center 120 over a data connection 112 or a server call 114. At block 406, the speaker mode of the communication device 110 is automatically enabled. The speaker mode may be enabled based on the same determination or control message, and/or based on a subsequent determination or control message. In some embodiments, the application 156 may automatically initiate the speaker mode when the call center call is unmuted. Thus, the voice of the live agent answering the call will be audible in the vicinity of the communication device 110. The audible voice of the live agent may signal to the user that the requested call has reached a live agent who is ready to speak to the user. In some embodiments, the speaker mode may be enabled while the call center call is still on hold, such that the audio played by the speaker is a holding sound such as music or a recorded message. In further embodiments, the timing for answering the user call may be determined based on previously collected data, such as an average amount of time taken for a live agent to be reached (e.g., based on queue length or other patterns).

At block 408, it is determined whether the communication device 110 has been picked up or otherwise changed physical location since the call was automatically answered. For example, the application 156 or another application executing on the communication device 110 can monitor data from one or more accelerometers, other motion sensors, proximity sensors, cameras, or the like, in the communication device 110 to detect a movement indicative of the communication device 110 being picked up by the caller. If it is not determined that communication device 110 has been picked up, the method 400 returns to block 408 and continues to monitor for device movement or proximity. If it is determined that the communication device 110 has been picked up, the method 400 terminates at block 410 by disabling the speaker mode of the communication device 110. For example, the disabling of speaker mode at block 410 may occur while the caller is lifting the communication device 110 (e.g., a smartphone) to the caller's ear, such that the caller can continue maintain a conversation with the live agent in a handset mode. Disabling the speaker mode may include enabling an alternate mode for transmitting and receiving audio or video for the call. For example, the alternate mode may activate a microphone to capture caller audio and a speaker to present audio received from the live agent. Alternatively, if the caller does not pick up the communication device 110, the conversation between the caller and the live agent may be maintained in a speaker mode indefinitely. In some embodiments, an option for the caller to manually disable the speaker mode may be provided, e.g., as a button presented to the user in a GUI. The automatic transition to handset mode may be different from existing uses of the various sensors of a communication device 110, which typically are used to turn the screen on and off based on proximity to the caller's head when in handset mode, rather than in speaker mode. In some embodiments, the determination to transition to handset mode may be based at least in part on correlation of the caller's sound volume with distance and/or background noise. In further embodiments, if the communication device 110 is connected to a headset (e.g., a BLUETOOTH® headset or other system), and the communication device 110 will automatically play the audio through the headset, rather than in speaker mode.

Proxy Message

Figure 5:
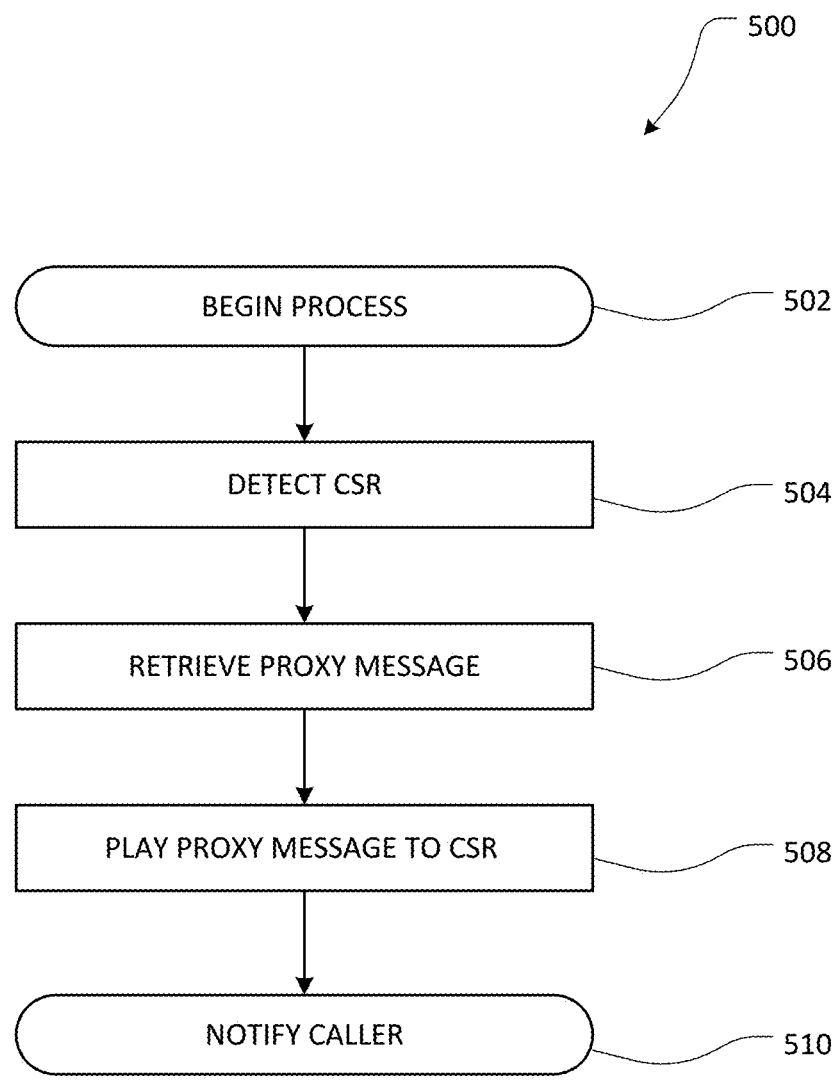
FIG. 5 is a flow diagram depicting an example method of maintaining a call center call using a proxy message.

FIG. 5 is a flow diagram depicting an example method of maintaining a call center call using a proxy message. As described above with reference to FIG. 2, the data center 120 may notify the caller at the communication device 110 based on the detection of a live agent. After the live agent answers the call center call, several seconds may elapse, while the caller is notified, before the caller begins speaking to the live agent. In some cases, the delay due to waiting for the caller to answer may be long enough to cause the live agent to believe there is no caller on the line and hang up before the caller can join the conversation. Thus, the proxy message method 500 depicted in FIG. 5 may be used to prevent the live agent from hanging up before the caller is notified and responds.

The method 500 begins at block 502 as a call is being held and monitored for a live agent. At block 504, a live agent is detected, as described above with reference to decision state 214 and block 232 in FIGS. 2A and 2B. When the live agent is detected, a proxy message is retrieved at block 506. For example, the proxy message can be stored in the database 124, retrieved by the server 122, and either played via the server call leg of the bridged call, or sent to the communication device 110 via a data connection to be played directly over the call center call. Alternatively, the proxy message can be stored at the communication device, for example, in the method 200B of FIG. 2B.

At block 508, the proxy message is sent to the live agent via the call center call. The proxy message can include an audio representation of a message to the live agent that will cause the live agent to remain on the line. Non-limiting examples of proxy messages include "please wait one moment while we connect your party," "hold on a second," "I'll be right back," etc. In some embodiments, the proxy message may be a default proxy message stored at the data center 120 to be used for all or many communication devices 110. The proxy message may further customized for a caller. For example, the caller may pre-select one of several optional proxy messages at the communication device 110, or the caller may pre-record a custom proxy message in the caller's own voice.

At block 510, the method 500 terminates as the caller is notified of the live agent's availability. In various embodiments, block 510 may be performed while the proxy message is being played to the live agent, or may be performed subsequent to playing the proxy message. Preferably, the live agent remains on the line upon hearing the proxy message until the caller answers the live agent in response to the notification.

In some embodiments, the method 500 may include adaptive or "smart" proxy message functionality. A smart proxy message system may monitor the call center call to determine when the caller has begun participating in the call center call and/or what the live agent has said when joining the call center call (e.g., to determine an appropriate response to the live agent out of a plurality of optional responses). In one example, if it is determined that the caller has picked up the communication device in the middle of a proxy message being played to the live agent, the system may allow the message to finish playing such that the caller hears the remainder of the proxy message and can determine how to interact accordingly with the live agent after the proxy message concludes (e.g., by not speaking during the proxy message, etc.). In another example, a plurality of optional proxy messages may include a message instructing the live agent to wait briefly, a message reciting the caller's name, and other messages reciting other pieces of information that a live agent may be expected to ask for upon answering (e.g., an account number, birth date, or the like). Thus, the system can monitor the words spoken by the live agent upon answering and determine if the live agent has requested specific information or simply answered the call, and play an appropriate proxy message based on the detected words.

Recording

Figure 6:
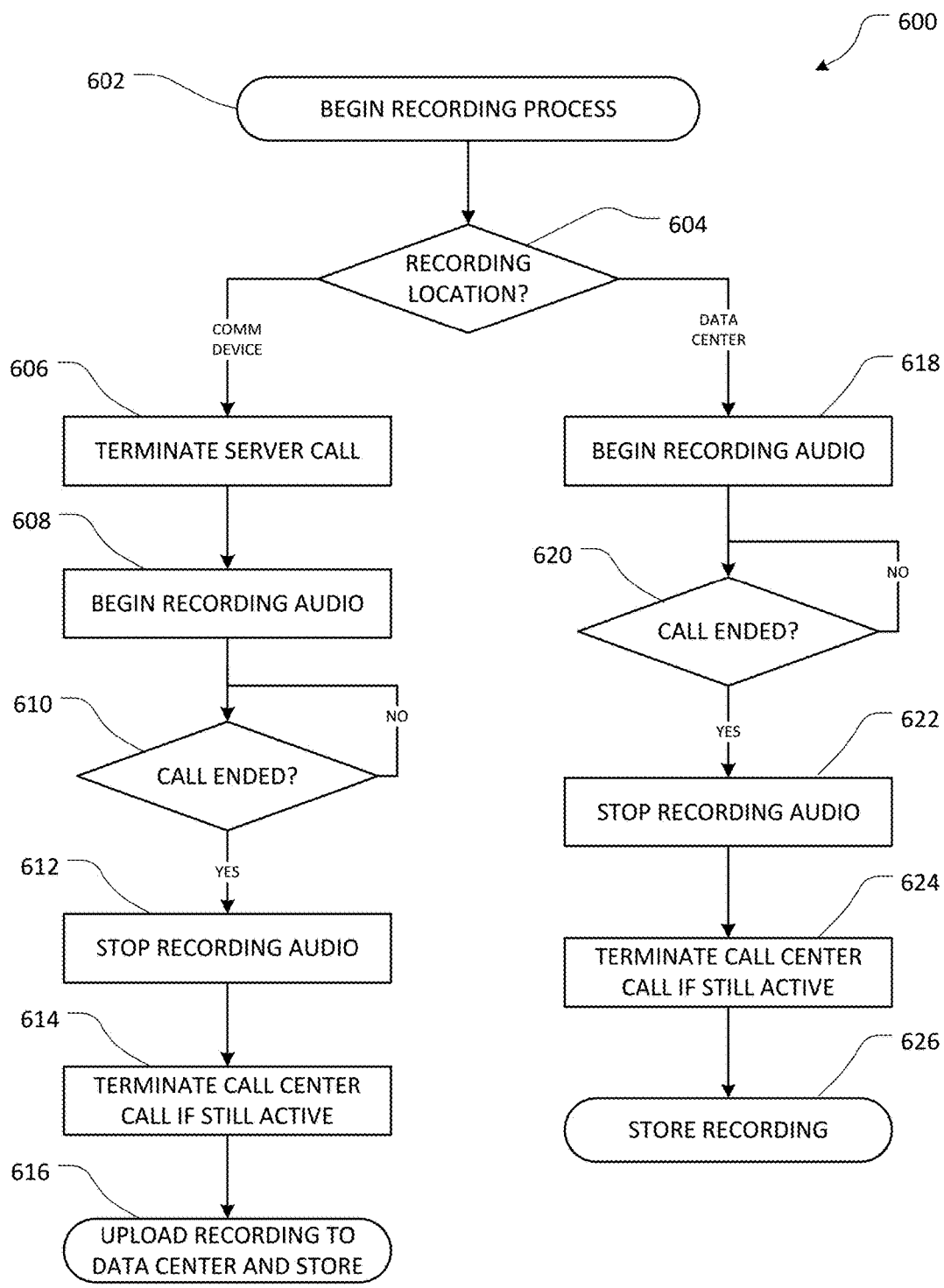
FIG. 6 is a flow diagram depicting an example method of recording a portion of a call.

FIG. 6 is a flow diagram depicting an example method of call recording. A portion of a call including audible interactions between a caller and a live agent may be recorded for various purposes. As will be described below, the recording method of FIG. 6 can be used for recording of audio at the communication device 110 and/or at the data center 120. The method 600 can be used with any of the methods 200A, 200B of automated telephone host interaction described with reference to FIGS. 2A and 2B.

The method 600 begins at block 602 when the recording process is initiated. For example, the recording process may be initiated upon detection of a live agent, when the caller is notified (e.g., at block 216 in FIG. 2A or block 234 in FIG. 2B), or at another point in the telephone host system interaction processes of FIGS. 2A and 2B. The method 600 proceeds to decision state 604, where it is determined whether the call will be recorded locally at the communication device 110 or remotely at the data center 120. In some embodiments, it may be desirable to record the call remotely at the data center 120, such as by recording the audio received at the data center 120 via the server call bridged with the call center call at the communication device 110. For example, recording at the data center 120 may avoid the need for substantial data transmission associated with sending the recording from the communication device 110 to the data center 120 after the call is terminated. In some embodiments, it may be desirable to record the call locally at the communication device 110 and subsequently send the recording or portions thereof to the data center 120 by a data connection. For example, if a server call and a call center call are used, recording at the communication device 110 may allow the server call to be disconnected once the live agent answers, reducing the amount of time the server call must be maintained and resulting in decreased fees to the caller. In addition, recording the call locally at the communication device 110 can allow for call recording in embodiments using method 200B of FIG. 2B, in which a server call is not used, making recording at the data center 120 difficult.

If the call will be recorded at the communication device 110, the method 600 continues to block 606, where the sever call is terminated. The server call may be terminated at any point when analysis or input from the data center 120 is no longer needed, for example, after any IVR prompts have been navigated and/or after the live agent has been detected. The method 600 continues to block 608, where the communication device 110 begins recording the audio received from the call center via the call center call. The audio may be stored in a memory of the communication device 110 as it is recorded, and/or may be recorded to a remote data store or streamed to the data center for storage. At decision state 610, the communication device 110 determines if the call has ended, as described elsewhere herein. If the call has not ended, the recording continues. When it is determined that the call has ended, the method 600 continues to block 612, where the communication device 110 stops recording audio in response to the end of the call. If the call center call is still active (e.g., if the call is being transferred), the call center call may be terminated at block 614. The method 600 terminates at block 616, as the communication device 110 uploads any recordings of the call to the data center 120 (e.g., if the audio was not streamed to the data center 120 during the call).

If the call will be recorded at the data center 120, the method 600 proceeds from decision state 604 to block 618, where the data center 120 begins recording audio. The data center 120 may receive audio from the communication device 110 and the call center 130a, 130b via the bridged call center call and server call. Thus, the audio received at the data center 120 via the server call leg includes the audio transmitted by both the call center 130a, 130b and the communication device 110. As the audio is recorded at the data center, it may be stored in a data store within the data center 120 or a remote data store in communication with the data center 120. At decision state 620, the data center 120 determines if the call has ended, as described elsewhere herein. If the call has not ended, the recording continues. When it is determined that the call has ended, the method 600 continues to block 622, where the data center 120 stops recording audio in response to the end of the call. If the call center call is still active (e.g., if the call is being transferred), the data center 120 may send a control message to the communication device 110 to cause the communication device 110 to terminate the call center call. The server call may also be terminated. The method 600 terminates at block 626, as storage of the audio recording is completed at the data store.

Disconnect Detection

Figure 7:
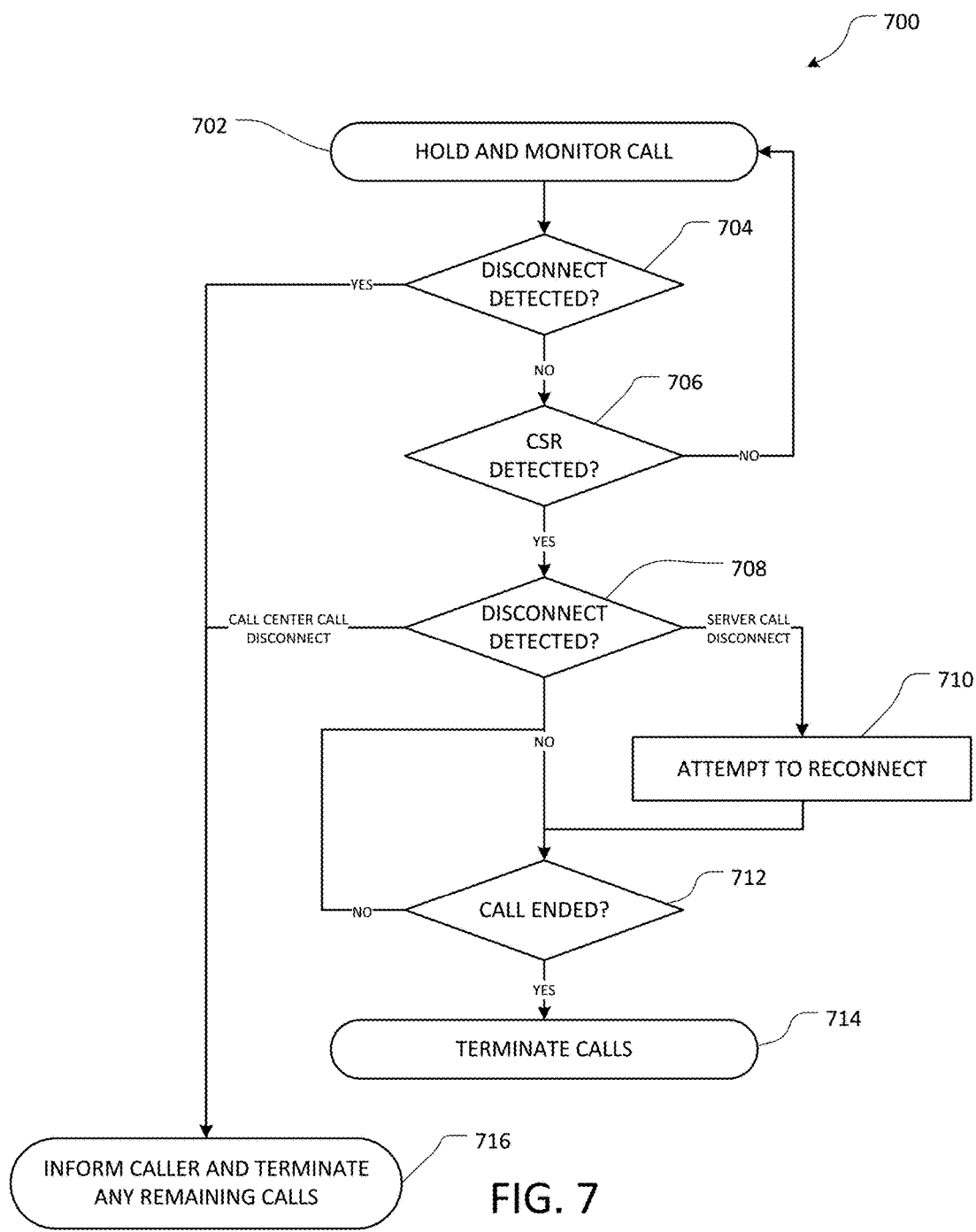
FIG. 7 is a flow diagram depicting an example method of disconnect detection and management.

FIG. 7 is a flow diagram depicting an example method of disconnect detection and management. During the course of any of the calls described herein, a disconnection may occur unexpectedly. For example, either or both of the server calls and the call center calls described herein may be dropped for various reasons such as a hardware or software malfunction at the communication device 110, a disconnection in the server call 114 (e.g., due to poor signal reception, a problem at the cellular network provider, etc.) or a malfunction at the data center 120 or the call center 130a, 130b. As will be described with reference to FIG. 7, the systems and methods described herein may be used to mitigate the additional time and inconvenience associated with repeating a call due to an unexpected disconnection of any leg (e.g., a user call, call center call, or other leg) of the call.

The method 700 begins at block 702 when the call center call has been initiated and the telephone host system at the call center has been navigated as necessary. For example, the method 700 can begin when blocks 212 and 230 occur in methods 200A and 200B as depicted in FIGS. 2A and 2B. As shown in decision states 704 and 708, a disconnection event may be detected after the call center call is initiated but before the live agent is detected at decision state 706, or after the live agent is detected at decision state 706. At decision state 704, the call center call and/or the server call (if applicable) may be disconnected. If a disconnection event is detected at decision state 704, for example, in the call center call, the user can be notified and any remaining calls (e.g., a server call) may be terminated at block 716. After termination, the system 100 may repeat the call flow, for example, by returning to the methods of FIGS. 2A and 2B.

At decision state 708, either the call center call or the server call may be dropped after the live agent is detected at decision state 706. If the call center call is disconnected, the method 700 continues to block 716, where the method 700 terminates as described above. If the server call is disconnected at decision state 708, the method 700 continues to block 710. At block 710, an attempt is made to reestablish the connection between the communication device 110 and the data center 120. For example, the communication device 110 may initiate a new server call to the same gateway or a different gateway associated with the same data center. If the attempt to reconnect is successful, the data center 120 may continue to interact with the communication device 110, for example, as described in the other example methods disclosed herein. If the attempt to reconnect is not successful, the communication device 110 may continue the call center call, as the live agent is already connected and may have begun a conversation with the caller. The call continues until the end of the call is detected at decision state 712. If any active calls remain after decision state 712, they may be terminated as the method 700 terminates at block 714.

Visual User Survey

Figure 8:
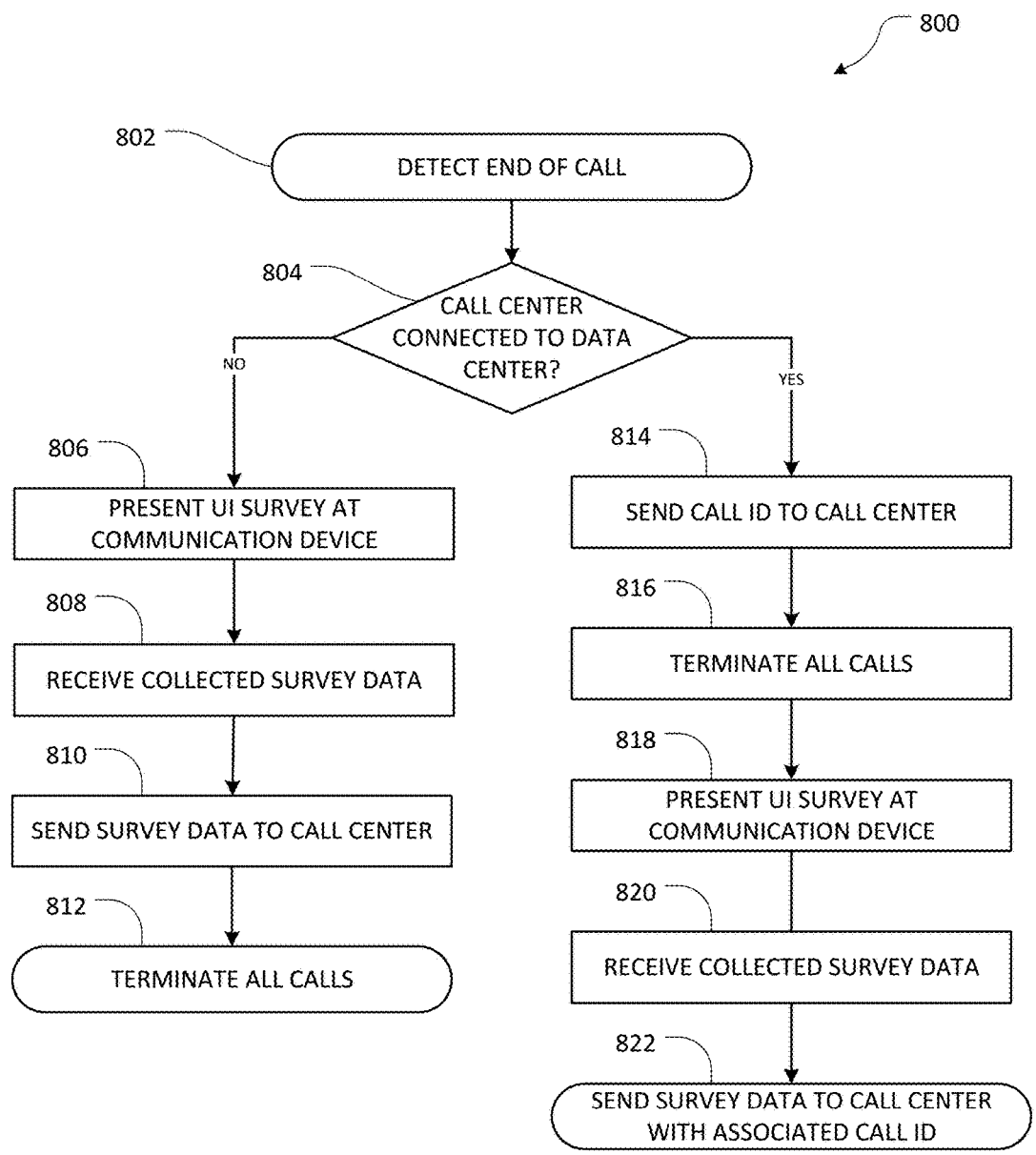
FIG. 8 is a flow diagram depicting an example method of conducting a user survey through a communication device interface.

FIG. 8 is a flow diagram depicting an example method of conducting a caller survey through a communication device interface. Call centers frequently utilize automated in-call surveys, for example, to collect feedback from callers after their interaction with a live agent is terminated. Callers may be given an option to remain on the line after the live agent disconnects, and the callers may be prompted by one or more IVR prompts to provide responses to survey questions. Frequently, callers elect not to participate in such in-call surveys due to the additional time required. The methods depicted in FIG. 8 may enhance the speed and efficiency of survey data collection and/or encourage greater participation by providing the survey questions and receiving responses through a GUI of the communication device 110 rather than through IVR responses. In some embodiments, the method 800 can be implemented with call centers such as the call center 130*a* depicted in FIG. 1A, which may have an existing relationship with the data center service, and may be configured to interact with the data center 120 via data connection 126. In addition, in some embodiments the data center 120 may additionally be configured to interact with a call center 130*a* by a call 127 independent of the communication device 110, which may be any type of call as described herein.

The method 800 begins at block 802 when the end of a call with a live agent is detected. The end of a call can be detected, for example, by determining that the call has been transferred (e.g., the call center call may have been transferred from the live agent to an automated survey extension), or by using natural language processing to detect phrases indicative of the end of a call (e.g., "goodbye," "thank you," "would you like to complete a survey?" etc.). In some embodiments, an end of a call may be detected based on an operational state of the communication device, for example, if the communication device is no longer connected to the call center call or is not in a "calling" mode. When the end of the call is detected, the method 800 continues to decision state 804. At decision state 804, the system 100 determines whether the call center is a call center 130*a* configured to communicate directly with the data center 120 or a call center 130*b* that is not in direct data communication with the data center 120.

If the call center is a call center 130*b* that does not communicate directly with the data center 120, the method 800 continues to block 806, in which the visual GUI survey information is sent to the communication device 110, where the survey can be presented visually to the user through a user interface. In some embodiments, each question may be converted to text by a speech-to-text function or other audio processing function of the data center 120 or the communication device 110. The text of each question can then be presented to the user via the display 170 of the communication device 110. The user can provide a response via the input device 172, and the response can be sent from the communication device to the data center 120. At block 808, the collected survey data is received at the data center 120. The visual survey may be presented to the user while the call center call is maintained in a muted or background mode at the communication device 110.

At block 810, the survey data is sent to the call center as a response to the IVR prompt. For example, a numeric survey answer can be provided by sending a DTMF tone from the communication device 110 the call center 130*b* via the call center call. A short text answer can be sent to the call center 130*b* via DTMF tones that can be interpreted at the call center by number-to-text protocols such as T-9 or the like. Thus, while the communication device 110 is maintaining the call center call in a background mode and is interacting with the user via a GUI, the call center 130*b* is able to receive survey responses via DTMF tones in real time as though the user had remained actively on the line to complete the survey. After the survey is complete, the method 800 terminates at block 812 when all calls are terminated.

If the call center is a call center 130*a* that does communicate directly with the data center 120, the method 800 proceeds from decision state 804 to block 814 for enhanced survey functionality. At block 814, a component of the system 100, such as the data center 120 or the communication device 110, sends a unique call or user identifier code to the call center 130*a*. The identifier can be associated with the call, the communication device, and/or the user, and may or may not be anonymous. At the call center 130*a*, the completed live agent call session is associated with the identifier. After the identifier is sent, the call center call and the server call, if applicable, can be terminated at block 816.

At block 818, user interface survey information is received from the call center 130*a* and presented to the caller at the communication device 110. For example, the survey information may be sent from the call center 130*a* to the data center 120 via the data connection 126. The survey information can be generated by the call center 130*a*, and can include one or more generic survey questions and/or one or more survey questions selected or generated based on any aspect of the completed live agent call session. The data center 120 sends the survey information to the communication device 110 via data connection 112 so that the caller can be prompted to complete the survey. At block 820, the data center 120 receives survey data collected from the user at the communication device 110. At block 822, the data center 120 sends to survey data and the associated call identifier to the call center 130*a*. At the call center, the collected survey data can be recorded and associated with the call identifier, for example, in a database of an entity associated with the call center. Because the survey is associated with a unique call identifier, the survey can be completed immediately or at a later time and real time responses are not required, although the survey can be completed without disconnecting the call connection. The survey data can be associated with the individual call at any time due to the associated call identifier.

Multi-Channel Processing

Figure 9:
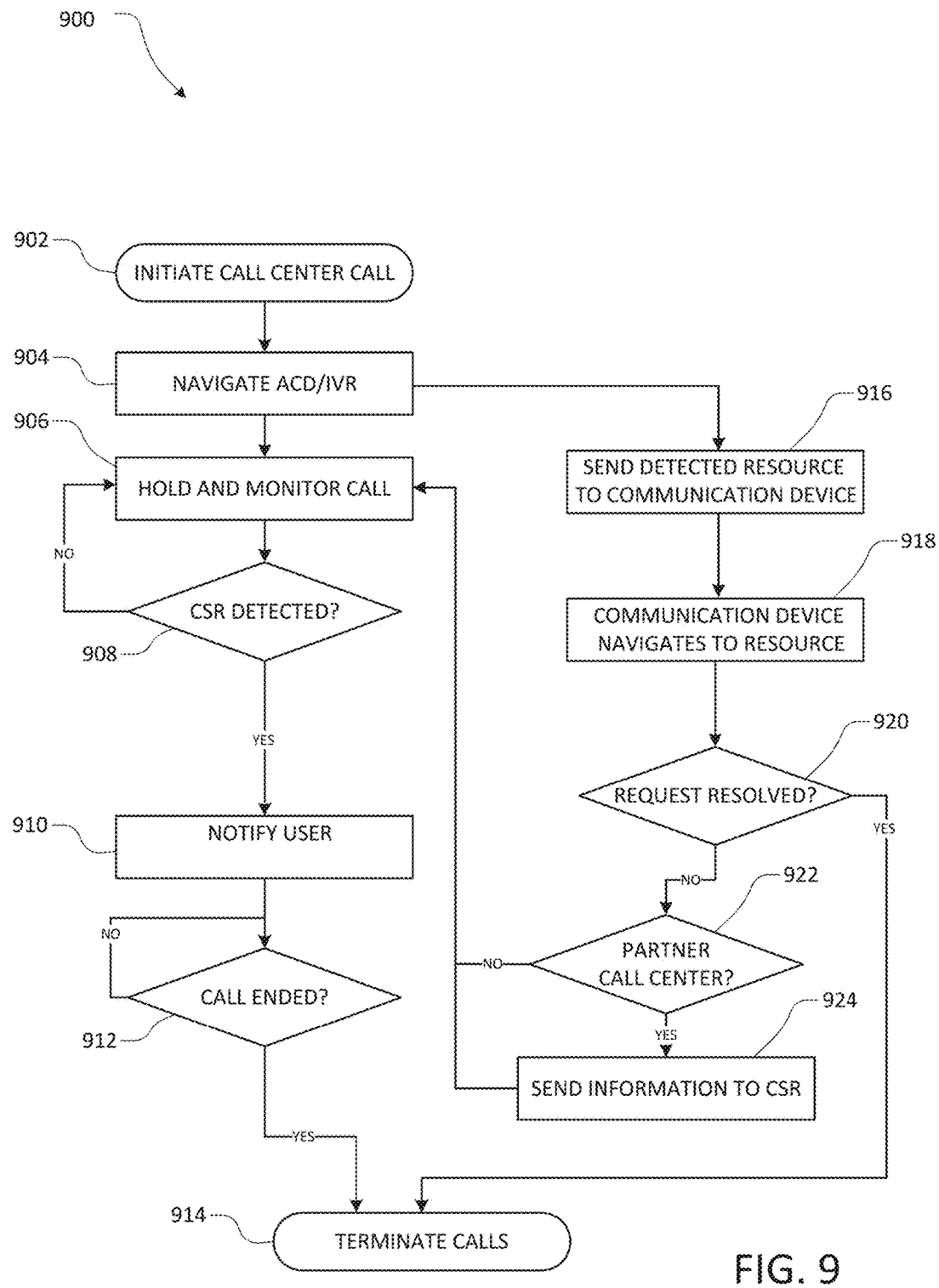
FIG. 9 is a flow diagram depicting an example method of multi-channel processing to resolve a user request.

FIG. 9 is a flow diagram depicting an example method of multi-channel processing to resolve a caller request. In many cases a caller may request a call to a call center to resolve an issue that may be resolvable by one or more other channels, for example, "self-help" channels such as a frequently asked questions page ("FAQ"), a chat bot or live chat hosted by the entity associated with the call center, an internet-based inquiry or request such as an online form or service request, or the like. The methods depicted in FIG. 9 may implement multi-channel functionality to assist the caller in resolving the issue while the caller is not actively participating in the call. In some cases, the caller's issue may be resolved while the system 100 is still navigating the call center or monitoring a held call center call, such that the call center call is no longer required and can be disconnected. In some embodiments, the method 900 can be implemented by the communication device 110 depicted in FIG. 1, which may be configured to access the internet or other network resources via a data connection.

The method 900 begins at block 902 when a call center call is initiated. As described above with reference to FIGS. 2A and 2B, the call center call may be initiated based on a user request, after call center information has been determined. At blocks 904, 906, an ACD, IVR system or other automated call handling system is navigated. While the call handling system is being navigated, a resource may be detected from the call handling system. For example, audio content transmitted from the call center may indicate a resource identifier such as a URL or other identifier for a customer service site. In some embodiments, the resource may be received additionally or alternatively from hold audio played while the call center call is on hold at block 906, and/or may be a known self-help resource stored in the database 124 or other data store of the system 100. If a customer service or inquiry resource is detected, the method 900 continues in parallel to block 916 while ACD/IVR navigation (block 904) and/or hold monitoring (block 906) continue.

At block 916, the detected resource is sent to the communication device 110. Upon receiving the resource, the communication device 110 may determine if the resource is appropriate for the caller request (e.g., if the resource can be used to resolve the caller request). For example, if the caller request corresponds to a general inquiry and the detected resource is a URL of a FAQ page, it may be determined that the resource is appropriate for the caller request. In another example, if the caller request corresponds to a request for service, or the caller is requesting to report a problem, and the detected resource is a URL of a FAQ page, it may be determined that the resource is not appropriate for the caller request. If the resource is appropriate for the caller request, the method 900 continues to block 918.

At block 918, the communication device 110 navigates to the resource. For example, the application 156 executing on the communication device 110 may automatically cause a browser application to open and navigate to the resource, or the caller may be prompted with an option to navigate to the resource. For example, the communication device 110 may display a prompt asking if the caller would like to try to resolve the request via live chat while waiting for a phone call with a customer service representative. The caller may then navigate to the resource and attempt to find the desired information, discuss their request with a chat bot or with an agent through a live chat, or the like.

At block 920, it is determined if the request has been resolved. For example, the application 156 may prompt the caller with a question about whether the request was resolved, or may display one or more selectable options on the screen while the caller is accessing the self help resource (e.g., a "resolved" button and a "not resolved" button, etc.). If the caller indicates that the request has been resolved, the method 900 continues to block 914. At block 914, it is determined that the user no longer needs the call center call. If the call center call is not needed for another open user request, the call center call is terminated. If the user indicates that the request could not be resolved by the self-help resource (e.g., the user's question was not answered in the FAQ page, the chat bot was unable to solve the user's problem, etc.), or if a live agent is detected at block 908 before the user indicates that the request is resolved, the method continues to block 922.

At block 922, it is determined whether the call center is affiliated with the system 100. For example, the call center may be configured for data connection with the data center 120 or communication device 110. If the call center is affiliated, the method continues to block 924, in which any further information obtained from the self-help side process (block 916-920) is sent to the call center and/or a live agent that has answered or will answer the call center call. For example, the information sent to the call center can include options selected by the caller in an online form, data the caller has entered to the resource (e.g., a description of the caller's question or problem), etc. Such information may be useful to live agent in determining how to assist the caller and/or quickly and efficiently resolving the caller's request without requiring the caller to provide similar information repeatedly. After the information is sent to the call center, or if the call center is not affiliated with the system 100, the method 1000 continues to block 1006, where the call flow proceeds substantially as described with reference to FIGS. 2A and 2B. The call center call continues to be monitored until a live agent is detected at block 908. When the live agent is detected, the caller can be notified at block 910. When it is determined at block 912 that the call has ended, the method 900 terminates at block 914 as any remaining calls are terminated.

Graphical User Interface

Figure 10B:
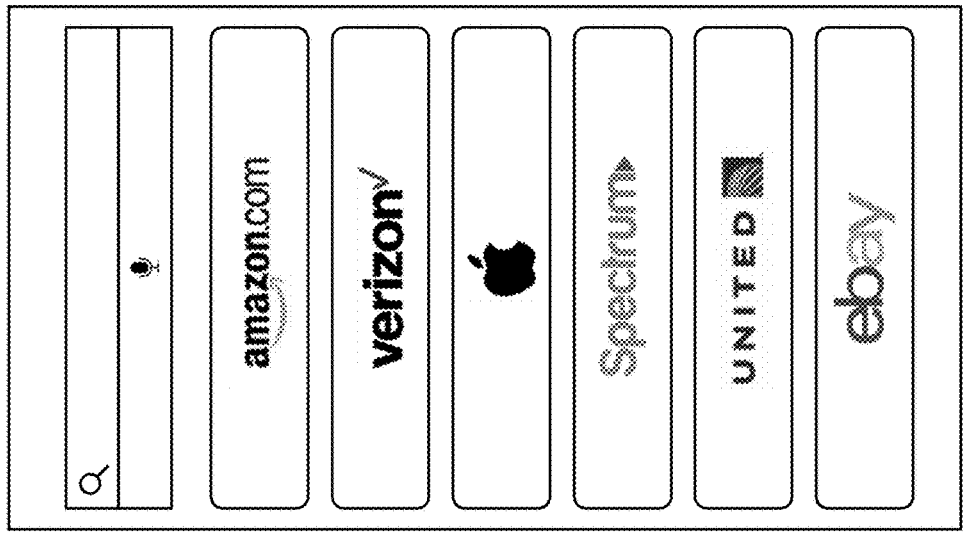
FIGS. 10A-10D depict example screens of an example graphical user interface for interacting with the communication systems and functionality described herein.
Figure 10A:
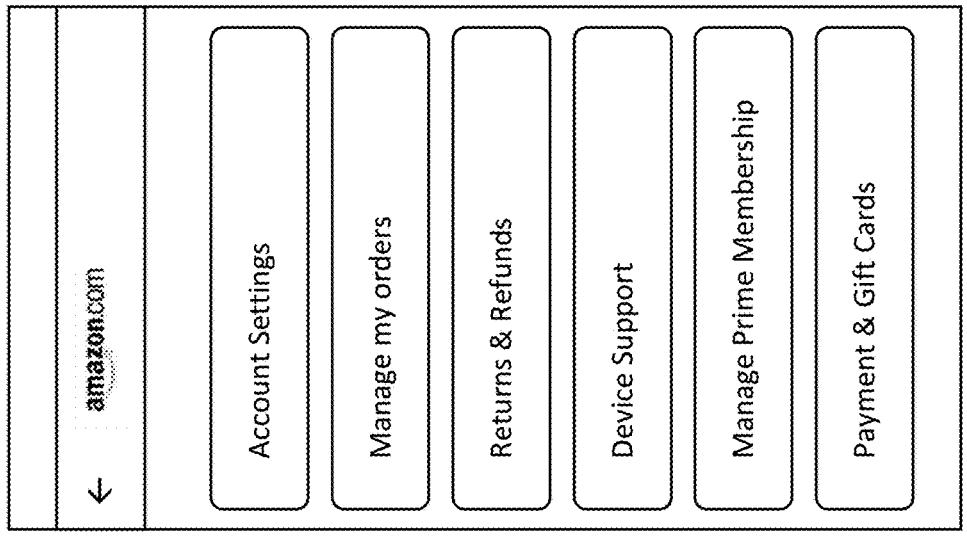
Figure 10D:
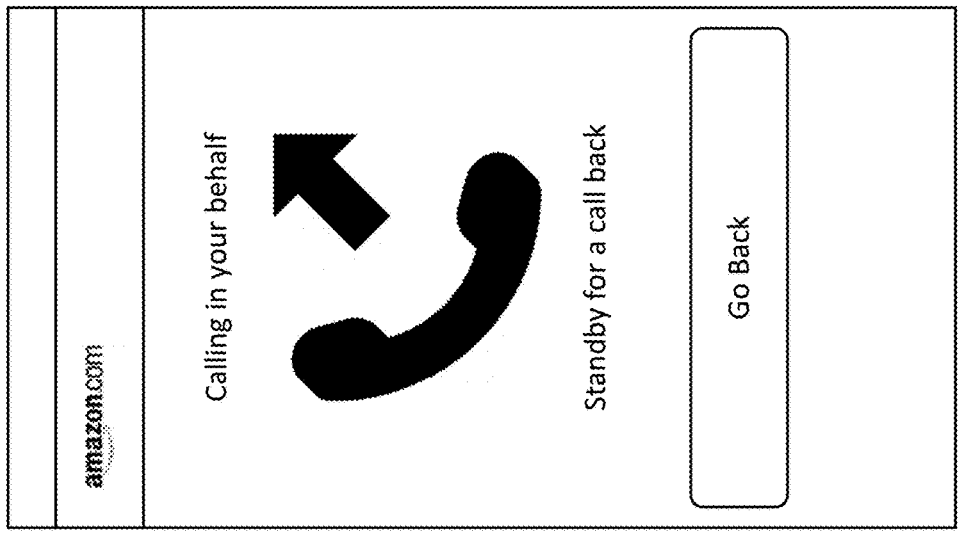
Figure 10C:
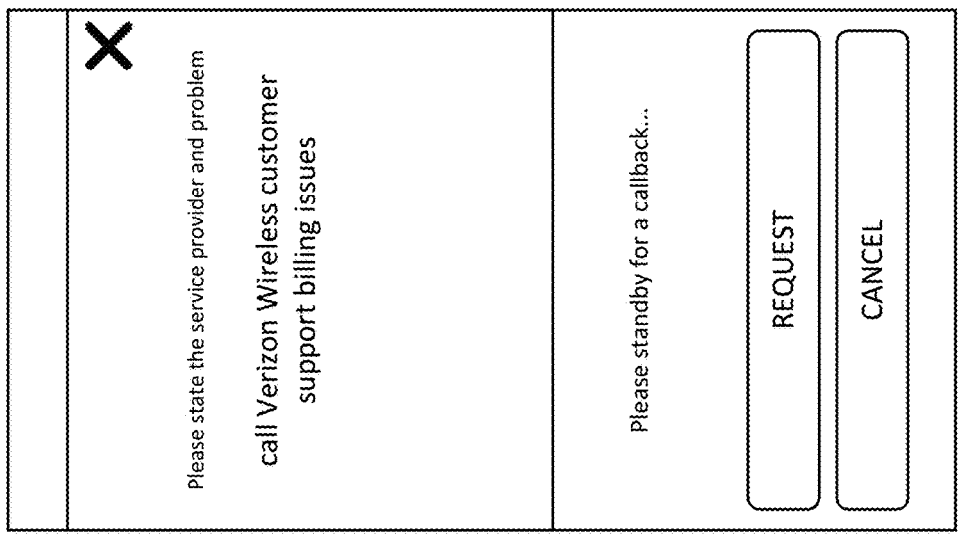

FIGS. 10A-10D depict screens of a graphical user interface (GUI) for interacting with any of the systems and/or methods described herein. For example, each of the screens depicted in FIGS. 10A-10D may be displayed on the display 170 of the communication device 110 by the application 156. FIG. 10A depicts a home screen in which options are provided for various known service providers, as well as a text search option and a speech input option. FIG. 10B depicts a set of options for a type of service call to be requested for an individual service provider. FIG. 10C depicts an example of a visual representation of a natural language input as transcribed by one or more processors under control of the application. FIG. 10D depicts an example standby screen that may be displayed to a caller, for example, while a call to the service provider is being placed (e.g., while an IVR system is being navigated, while the call center call is on hold and being monitored, etc.).

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A secure access control device (e.g. remote access server or monitoring device) can be or include a microprocessor, but in the alternative, the secure access control device can be or include a controller, microcontroller, or state machine, combinations of the same, or the like configured to authenticate and authorize remote access for delivery of an item. A secure access control device can include electrical circuitry configured to process computer-executable instructions. Although described herein primarily with respect to digital technology, a secure access control device may also include primarily analog components. For example, some or all of the access control algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by a secure access control device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the secure access control device such that the secure access control device can read information from, and write information to, the storage medium. In the alternative, the storage medium can be integral to the secure access control device. The secure access control device and the storage medium can reside in an application specific integrated circuit (ASIC). The ASIC can reside in an access device or other secure access control device. In the alternative, the secure access control device and the storage medium can reside as discrete components in an access device or electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "a" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein, a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

As used herein, a "call" may encompass a wide variety of telecommunication connections between at least a first party and a second party. A call may additionally encompass a communication link created by a first party that has not yet been connected to any second party. A call may be a communication link between any combination of a communication device (e.g., a telephone, smartphone, hand held computer, etc.), a VoIP provider, other data server, a call center including any automated call handling components thereof, or the like. A call may include connections via one or more of a public switched telephone network (PSTN), wired data connection, wireless internet connection (e.g., LTE, Wi-Fi, etc.), local area network (LAN), plain old telephone service (POTS), telephone exchanges, or the like. A call may include transmission of audio data and/or non-audio data, such as a text or other data representation of an audio input (e.g., a transcript of received audio). Accordingly, a connection type for a call may be selected according to the type of data to be transmitted in the call. For example, a PSTN or VoIP connection may be used for a call in which audio data is to be transmitted, while a data connection may be used for a call in which a transcript or other non-audio data will be transmitted.

As used herein, a "hold" or a "held call" can encompass a wide variety of pauses or suspensions in a call. A held call may be in a configuration in which a connection is maintained between two parties to a call. While a call is held, audio such as music, on hold messaging or other recorded audio may be transmitted to at least one party to the call. The party to which the audio is transmitted may be referred to as being "on hold."

As used herein, an "open call" refers to a call available to be transferred to a user. For example, an open call may be a call between a VoIP provider and a call center ready to be bridged with a user call.

As used herein, "bridging" or "merging" refer to a variety of processes of combining two or more calls into a single call. For example, a call between a VoIP provider and a communication device may be bridged with a call between the VoIP provider and a call center such that the user and an agent at the call center can exchange voice transmissions. In another example, a communication device connected to two or more calls (e.g., cellular, VoIP, or PSTN calls) may bridge or merge the calls together such that the three or more parties to the original two or more calls can exchange audio transmissions.

As used herein, "making," "placing," or "initiating" a call refers to a process of creating a call by one party to the call.

As used herein, "accepting" a call refers to a process that a user or the user's device can perform to allow voice transmission on both sides of the call.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A system comprising:
one or more client applications executable by respective communication devices, each communication device comprising one or more processors configured with processor-executable instructions included in the client application to perform operations comprising at least:
storing, by the communication device, caller information for a calling party, wherein the caller information includes generic caller information and provider specific caller information;
receiving, via the communication device, a request associated with a service provider;
determining that the request is associated with at least one of the generic caller information and the provider specific caller information; and
transmitting request information including the generic caller information and the provider specific caller information via a network; and
a server comprising one or more processors configured with processor-executable instructions to perform operations comprising at least:
receiving, via the network, the request information from the communication device; and
transmitting, to the communication device, call center information associated with a call center of the service provider corresponding to the request;
wherein the one or more processors of the communication device are further configured with processor-executable instructions to perform operations comprising, responsive to receiving the call center information, at least:
initiating a call center call to the call center;
initiating a server call to the server; and
bridging the server call and the call center call in a muted mode such that audio can be transmitted between the server, the communication device, and the call center without being transmitted by a speaker of the communication device; and wherein the one or more processors of the server are further configured with processor-executable instructions to perform operations comprising at least:
determining that a live agent associated with the call center of the service provider has answered the call center call based at least in part on information detected from the call center call; and
sending a control message to the communication device to cause the communication device to terminate the muted mode such that audio can be transmitted between the user and the live agent.

2. The system of claim 1, wherein the server call comprises an audio connection over at least one of a cellular network and PSTN, and wherein initiating the server call comprises causing a telephony service to initiate the audio connection between the communication device and a gateway associated with the server.

3. The system of claim 1, wherein the server call comprises a VoIP audio session, and wherein initiating the server call comprises causing a telephony service to initiate the VoIP audio session between the communication device and a communication interface associated with the server.

4. The system of claim 1, wherein sending the control message comprises transmitting a dual-tone multi-frequency (DTMF) audio signal via the server call.

5. The system of claim 1, wherein sending the control message comprises transmitting the control message to the communication device via a network data connection between the server and the communication device.

6. The system of claim 1, wherein the control message causes the communication device to activate a speaker mode such that audio from the call center call is played at a louder volume relative to a handset mode of the communication device.

7. The system of claim 1, wherein the one or more processors of the server are further configured with processor-executable instructions to perform operations comprising, after the server call and the call center call are bridged at the communication device, at least:
receiving at least one interactive voice response (IVR) prompt transmitted by the call center;
determining, based at least in part on stored call flow information corresponding to the call center, a response to the IVR prompt, wherein the stored call flow information comprises a map of at least a portion of an IVR tree; and
transmitting an audio representation of the response to the call center via the server call bridged with the call center call.

8. The system of claim 1, wherein the one or more processors of the server are further configured with processor-executable instructions to perform operations comprising, after the server call and the call center call are bridged at the communication device, at least:
receiving at least one interactive voice response (IVR) prompt transmitted by the call center;
determining, based at least in part on stored call flow information corresponding to the call center, a response to the IVR prompt, wherein the stored call flow information comprises a map of at least a portion of an IVR tree; and
transmitting an IVR control message to the communication device via a network data connection, wherein the IVR control message causes the communication device to transmit an audio representation of the response to the call center via the call center call.

9. The system of claim 1, wherein the one or more processors of the server are further configured with processor-executable instructions to perform operations comprising, after determining that the live agent has answered the call center call, at least:
recording audio received at the server via the server call;
terminating audio recording responsive to a termination of the server call; and
causing, at least in part, storage of the recorded audio in a data store associated with the server.

10. The system of claim 1, wherein the one or more processors of the communication device are further configured with processor-executable instructions to perform operations comprising, responsive to receiving the control message, at least:
recording audio received at the communication device via the call center call;
terminating the server call;
detecting termination of the call center call based at least in part on at least one of: the audio received via the call center call or an operational state of the communication device;
in response to detecting the termination, terminating the recording of the audio; and
transmitting the audio recorded to the server via a network data connection.

11. A system comprising:
one or more client applications executable by respective communication devices, each communication device comprising one or more processors configured with processor-executable instructions included in the client application to perform operations comprising:
storing, by a communication device, user information for a user, wherein the user information includes generic user information and provider specific user information;
receiving, from the user of the communication device, a request associated with a service provider;
determining that the request is associated with at least one of the generic user information and the provider specific user information; and
transmitting request information including the generic user information and the provider specific user information via a network; and
a server comprising one or more processors configured with processor-executable instructions to perform operations comprising:
receiving, via the network, the request information from the communication device; and
transmitting, to the communication device, call center information associated with a call center corresponding to the request and call flow information corresponding to the request;
wherein the one or more processors of the communication device are further configured with processor-executable instructions to perform operations comprising, responsive to receiving the call center information and the call flow information:
initiating a call to the call center in a muted mode such that audio can be transmitted between the communication device and the call center without being played by a speaker of the communication device;
determining that a live agent has answered the call; and
terminating the muted mode such that audio can be transmitted between the user and the live agent.

12. The system of claim 11, wherein the one or more processors of the communication device are further configured with processor-executable instructions to perform operations comprising, after initiating the call:
 receiving at least one interactive voice response (IVR) prompt transmitted by the call center;
 determining, based at least in part on the call flow information received from the server, a response to the IVR prompt; and
 transmitting an audio representation of the response to the call center via the call.

13. The system of claim 12, wherein the call flow information comprises a map of an IVR tree corresponding to the call center, and wherein the response is determined based at least in part on an IVR tree routing corresponding to the request.

14. The system of claim 13, wherein the call flow information comprises at least one of a phone tree routing corresponding to the request and a phone tree endpoint corresponding to the request.

15. The system of claim 14, wherein the call flow information further comprises a predetermined response to the IVR prompt.

16. The system of claim 13, wherein the one or more processors of the communication device are further configured with processor-executable instructions to perform operations comprising, responsive to receiving the call flow information, identifying, based on the request information, at least one of a phone tree routing corresponding to the request and an IVR tree endpoint corresponding to the request.

17. The system of claim 11, wherein terminating the muted mode comprises activating a speaker mode of the communication device such that audio from the call is played at a louder volume relative to a handset mode of the communication device.

18. The system of claim 11, wherein the one or more processors of the communication device are further configured with processor-executable instructions to perform operations comprising, responsive to determining that the live agent has answered the call:
 recording audio received at the communication device via the call;
 terminating audio recording responsive to a termination of the call; and
 uploading the recorded audio to the server via a network data connection.

19. A system comprising:
 one or more client applications executable by respective communication devices, each communication device comprising one or more processors configured with processor-executable instructions included in the client application to perform operations comprising:
  storing, by a communication device, user information for a user, wherein the user information includes generic user information and provider specific user information;
  receiving, from the user of the communication device, a request associated with a service provider;
  determining that the request is associated with at least one of the generic user information and the provider specific user information; and
  transmitting request information including the generic user information and the provider specific user information via a network; and
 a server comprising one or more processors configured with processor-executable instructions to perform operations comprising:
  receiving, via the network, the request information from the communication device;
  identifying a call center corresponding to the request;
  selecting a trilateral call handling functionality based at least in part on one or more of a network latency between the server and the communication device, an identity of the call center, call flow information corresponding to the call center, a characteristic of the communication device, and a request type corresponding the request information; and
  transmitting, to the communication device, call information associated with a call center corresponding to the request, the call information comprising a control message that causes the communication device to at least initiate a call center call to the call center, initiate a server call to the server, and bridge the server call and the call center call in a muted mode such that audio can be transmitted between the server, the communication device, and the call center without being transmitted by a speaker of the communication device.

20. The system of claim 19, wherein the one or more processors of the server are further configured with processor-executable instructions to perform operations comprising at least:
 determining that a live agent associated with the call center of the service provider has answered the call center call based at least in part on information detected from the call center call; and
 sending a control message to the communication device to cause the communication device to terminate the muted mode such that audio can be transmitted between the user and the live agent.

21. The system of claim 19, wherein the one or more processors of the server are further configured with processor-executable instructions to perform operations comprising at least:
 selecting a server call connection type;
 wherein the call information comprises server call information indicating the selected server call connection type; and
 wherein the server call connection type is selected based at least in part on one or more of a network latency between the server and the communication device, an identity of the call center, call flow information corresponding to the call center, a characteristic of the communication device, and a request type corresponding the request information.

22. A method comprising:
 storing, at a communication device, user information for a user, wherein the user information includes generic user information and provider specific user information;
 receiving, via a client application executing on the communication device, a request from the user, the request associated with a service provider;
 determining, by the client application, that the request is associated with at least one of the generic user information and the provider specific user information;
 transmitting, from the communication device to a server associated with the client application, request information including the generic user information and the provider specific user information via a network;

receiving, at the server via the network, the request information from the communication device;

identifying, at the server, a third-party call center corresponding to the request;

automatically selecting, by the server, a trilateral call handling functionality based at least in part on one or more of a network latency between the server and the communication device, an identity of the call center, call flow information corresponding to the call center, a characteristic of the communication device, and a request type corresponding to the request information; and transmitting, from the server to the communication device, call information associated with a call center corresponding to the request, the call information comprising a control message that causes the communication device to at least initiate a call center call to the call center, initiate a server call to the server, and bridge the server call and the call center call in a muted mode such that audio can be transmitted between the server, the communication device, and the call center without being transmitted by a speaker of the communication device.

23. The system of claim 22, further comprising:

determining, at the server, that a live agent associated with the call center of the service provider has answered the call center call based at least in part on information detected from the call center call; and sending a control message from the server to the communication device to cause the communication device to terminate the muted mode such that audio can be transmitted between the user and the live agent.

24. The system of claim 22, further comprising selecting a server call connection type from the group consisting of a cellular network audio connection, a PSTN audio connection, and a VoIP audio session, wherein the call information comprises server call information indicating the selected server call connection type, and wherein the server call connection type is selected based at least in part on one or more of a network latency between the server and the communication device, an identity of the call center, call flow information corresponding to the call center, a characteristic of the communication device, and a request type corresponding the request information.

* * * * *